US005553078A

United States Patent [19]

Horie

[11] Patent Number: 5,553,078
[45] Date of Patent: Sep. 3, 1996

[54] COMMUNICATION CONTROL SYSTEM BETWEEN PARALLEL COMPUTERS

[75] Inventor: Takeshi Horie, Kawasaki, Japan

[73] Assignee: Fujitsu Limited, Kawasaki, Japan

[21] Appl. No.: 372,825

[22] Filed: Jan. 13, 1995

Related U.S. Application Data

[63] Continuation of Ser. No. 584,052, Sep. 18, 1990, abandoned.

[30] Foreign Application Priority Data

Oct. 26, 1989 [JP] Japan .................................. 1-279055
Sep. 18, 1990 [JP] Japan .................................. 1-240186

[51] Int. Cl.⁶ ............................................. H04J 3/26
[52] U.S. Cl. ........................... 370/94.3; 370/60; 370/94.1
[58] Field of Search ............................. 370/94.3, 94.1, 370/54, 60, 85.9, 85.12; 340/825.52, 826, 825.03; 364/284.3, 284.4

[56] References Cited

U.S. PATENT DOCUMENTS

| | | | |
|---|---|---|---|
| 4,598,400 | 6/1986 | Hillis | 370/60 |
| 4,692,917 | 9/1987 | Fujioka | 370/60 |
| 4,736,465 | 4/1988 | Bobey et al. | 370/94.3 |
| 4,742,511 | 5/1988 | Johnson | 370/85.9 |
| 4,872,162 | 10/1989 | Tanaka et al. | 370/94.1 |
| 4,933,933 | 6/1990 | Dally et al. | 370/85.12 |
| 4,984,235 | 1/1991 | Hillis et al. | 370/94.1 |
| 5,105,424 | 4/1992 | Flaig et al. | 370/94.1 |
| 5,157,692 | 10/1992 | Horie et al. | 370/60 |
| 5,175,733 | 12/1992 | Nugent | 370/60 |

FOREIGN PATENT DOCUMENTS

| | | | |
|---|---|---|---|
| 0104796 | 4/1984 | European Pat. Off. | 370/60 |
| 60-181962 | 9/1985 | Japan . | |
| 63-113659 | 5/1988 | Japan . | |
| 88/08652 | 11/1988 | WIPO | 370/94.1 |

OTHER PUBLICATIONS

Dally et al., "The torus routing chip", *Distributed Computing*, pp. 187–196, Oct., No. 4, 1986.

*Primary Examiner*—Stephen Chin
*Assistant Examiner*—T. Ghebretinsae
*Attorney, Agent, or Firm*—Staas & Halsey

[57] ABSTRACT

A communication control system between parallel computers performs a broadcast communication in a network between parallel computer nodes. The communication control system includes a destination detecting unit for detecting the destination information designating the scope of the destination nodes from the data; a between-node distance processing unit for obtaining the distance between the particular computer node and the destination computer node, based on the destination information; and a destination judgment unit for judging whether the data should be obtained by the self node or whether the data should be further transmitted to the other node and for determining the direction of the transmission, based on the distance information.

11 Claims, 23 Drawing Sheets

FIG. 3 *PRIOR ART*

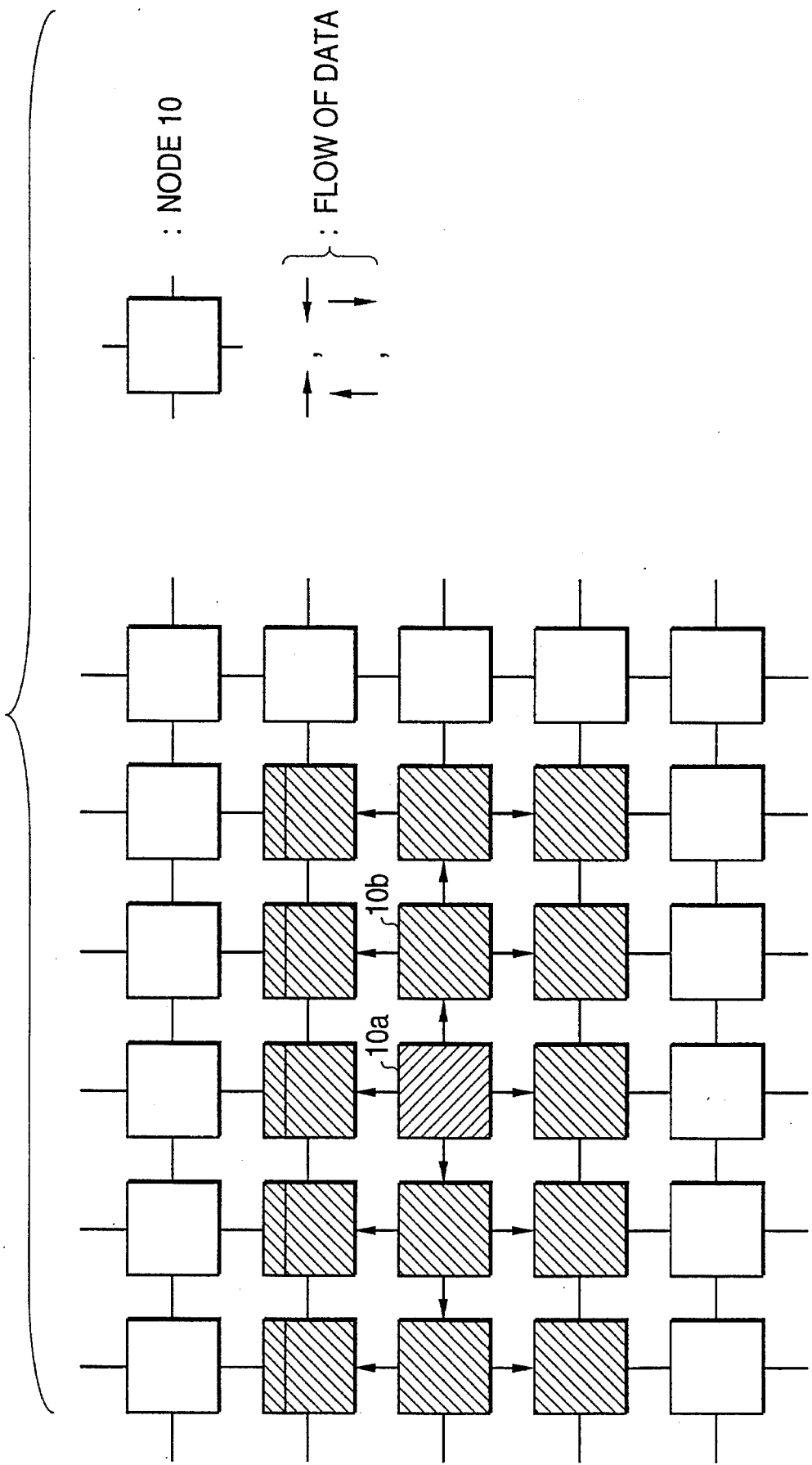

WHEN DATA IS RECEIVED IN -X DIRECTION

WHEN DATA IS RECEIVED IN +X DIRECTION

WHEN DATA IS RECEIVED IN -Y DIRECTION

FIG. 10E
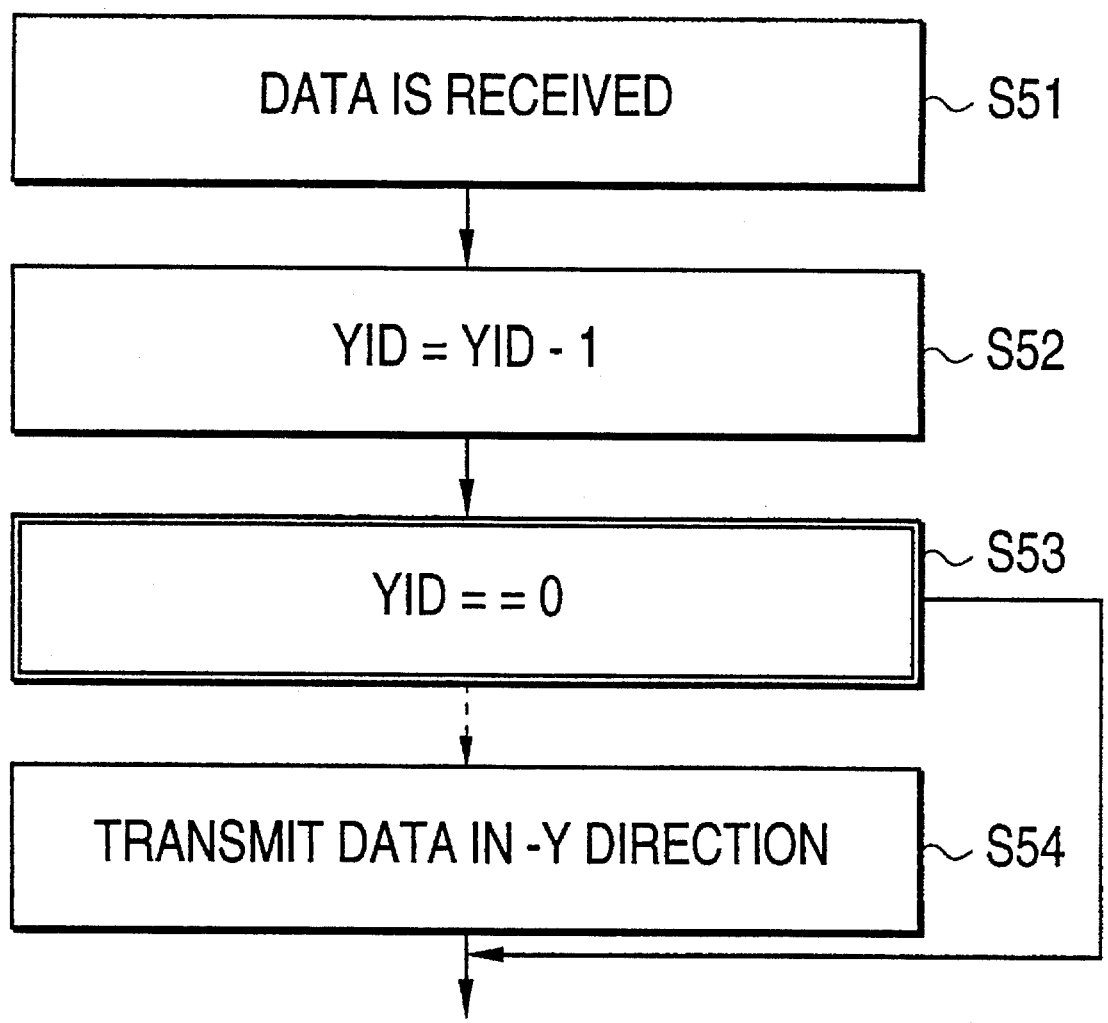
YID  Y DIRECTION BETWEEN - NODE DISTANCE
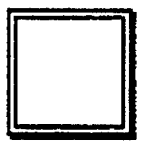 JUDGMENT PROCESS  --→ NO
⎯→ YES
WHEN DATA IS RECEIVED FROM UPPER NODE IN +Y DIRECTION

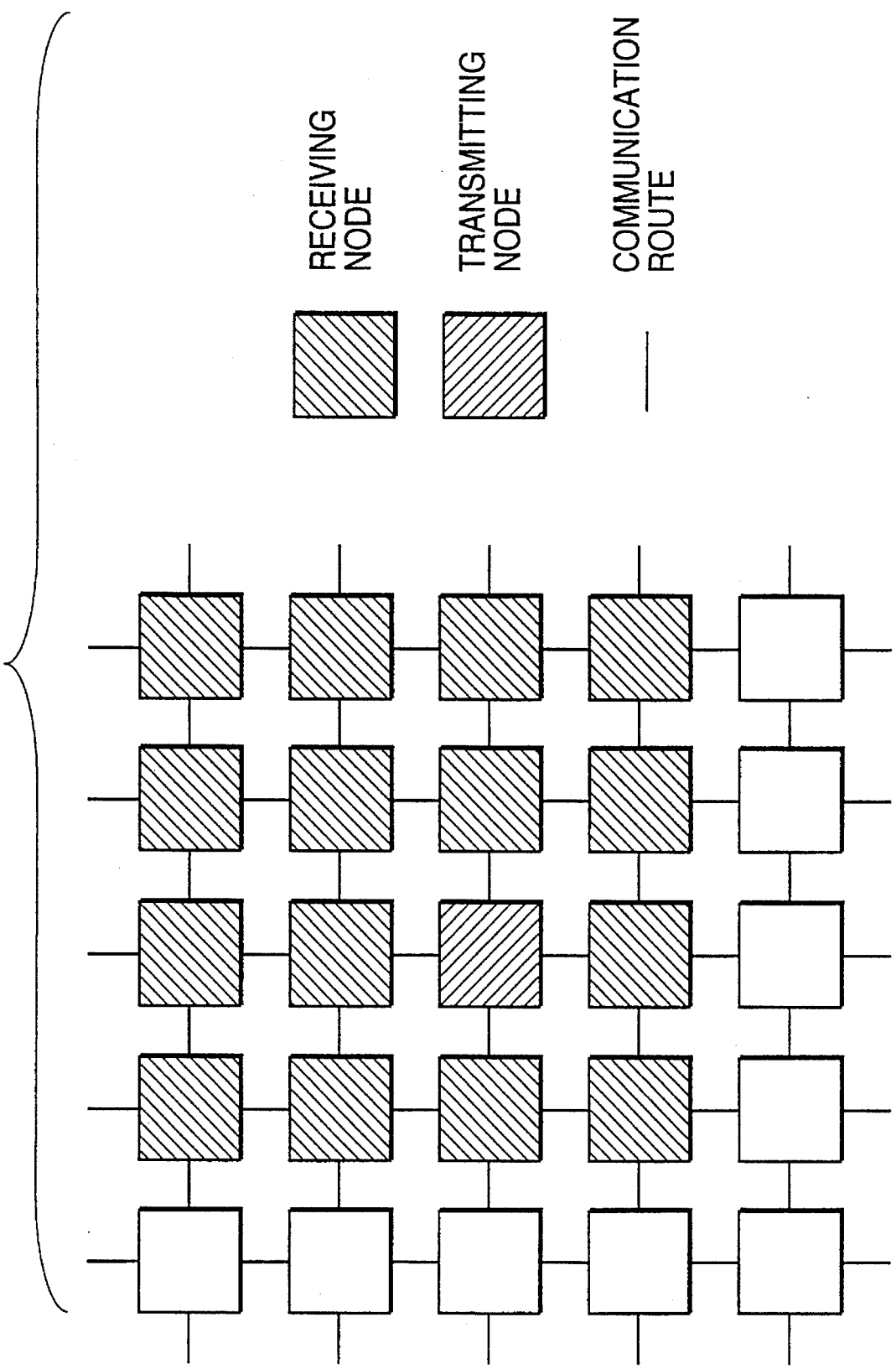

COMMUNICATION CONTROL SYSTEM BETWEEN PARALLEL COMPUTERS

This application is a continuation of application Ser. No. 07/584,052, filed Sep. 18, 1990, now abandoned.

BACKGROUND OF THE INVENTION (a) Field of the Invention

The present invention relates to a communication system of parallel computers in a field of a multiprocessor system i.e., MIDI (multiple instruction stream multiple data stream) in which a plurality of programs operate in parallel and more particularly to a communication system in a network between parallel computers connected in N-dimensional torus connection (in which one end node is connected to the other end node) or N-dimensional matrix connection where a broadcast communication or a simultaneous communication for simultaneously transmitting the same content to many receiving nodes by designating the scope of the destination nodes.

(b) Related Art

A conventional communication system for performing a broadcast communication is shown in FIG. 1. This system transmits data by designating the coordinate ID of the destination nodes. A receiving process unit 1 receives data transmitted from other nodes and a destination detection unit 2 detects the destination coordinate of the data. A destination judgment unit 3 judges determines whether the destination coordinate designates the self (or local) node (same node) or other node (different node) and obtains maintains the data when the destination coordinate designates the self node. A transmission process unit 4 transmits the data to the other node if the destination coordinate is for the other node.

In a network of parallel computers connected as shown in two-dimension torus connection as shown in FIG. 2, when the data is transmitted from transmitting node N61 to receiving node N67, the transmission data designates the coordinate of receiving node N67 and the data transmitted from node N61 is transferred to node N67 by being relayed via nodes N62 and N63. Respective receiving nodes can only relay or receive the data. Therefore, as shown in FIG. 3, the present network performs a broadcast communication from node N76 to nodes N71, N72, N73, N75, N77, N79, N710 and N711 as follows. A process of (1) data transmission from node N76 to node N71, (2) data transmission from node N76 to node N72, (3) data transmission from node N76 to node N73, (4) data transmission from node N76 to node N75, (5) data transmission from node N76 to node N77, (6) data transmission from node N76 to node N79, (7) data transmission from node N76 to node N710 and (8) data transmission from node N76 to node N711 is repeated. Therefore, in the above recited method, node N76 transmits the data to respective nodes eight times.

In the prior art, where a communication is performed between parallel computers connected in a torus connection, the coordinates of the destination nodes are designated in the data and the transmitted data is merely relayed by the nodes on the way and is transmitted to the destination receiving node. Therefore, where a broadcast communication is performed, the transmission source node repeats the data transmission at times corresponding to the number of the receiving node. Where the same message is transmitted from a node to a plurality of other nodes, namely, where a broadcast communication is performed, a transmission is repeated so that the message is transmitted from one node to a plurality of other nodes one by one. Therefore, there is a problem that the broadcast communication cannot be performed with high speed and high efficiency.

Further, in the prior art, the control of the node for relaying the data which is performed by designating the coordinates, is complex.

SUMMARY OF THE INVENTION

An object of the present invention is to provide a communication system between parallel computers capable of performing a broadcast communication designating the scope of the destination node.

Another object of the present invention is to perform a broadcast communication in a worm-hole routing with high speed and high efficiency by transmitting the message divided into flits each comprising one-flit transmission unit. A header flit selected from the flits is given information of the scope of a broadcast transmission, by enabling the receiving node to refer to the scope information to preserve the message in the self node and to transmit the message to the destination node.

A feature of the present invention resides in a communication control system between parallel computers for performing a broadcast communication in a network between parallel computer nodes which are connected in N-dimension torus connection or N-dimension lattice connection, the system comprising data receiving means for receiving the data transmitted from other nodes in respective directions, destination detecting means for detecting the destination information designating the scope of the destination nodes from the data, between-node distance processing means for obtaining the distance between the particular computer node and the destination computer node, based on the destination information, destination judgment means for judging determining whether the data should be obtained by the self node, (and) for judging, based on the distance information, whether the data should be further transmitted to the other node and for determining the direction of the transmission, and transmitting process means for transmitting the data whose destination is judged, with regard to the particular direction.

BRIEF DESCRIPTION OF THE DRAWINGS

FIG. 5B shows a block diagram of a two-dimensional network, FIGS. 10A to 10E shows the process flow of a receiving node in the present embodiment, FIG. 11A shows an embodiment in which the scope of the destination is shifted in one direction.

DETAILED DESCRIPTION OF THE PREFERRED EMBODIMENT

Figure 1:
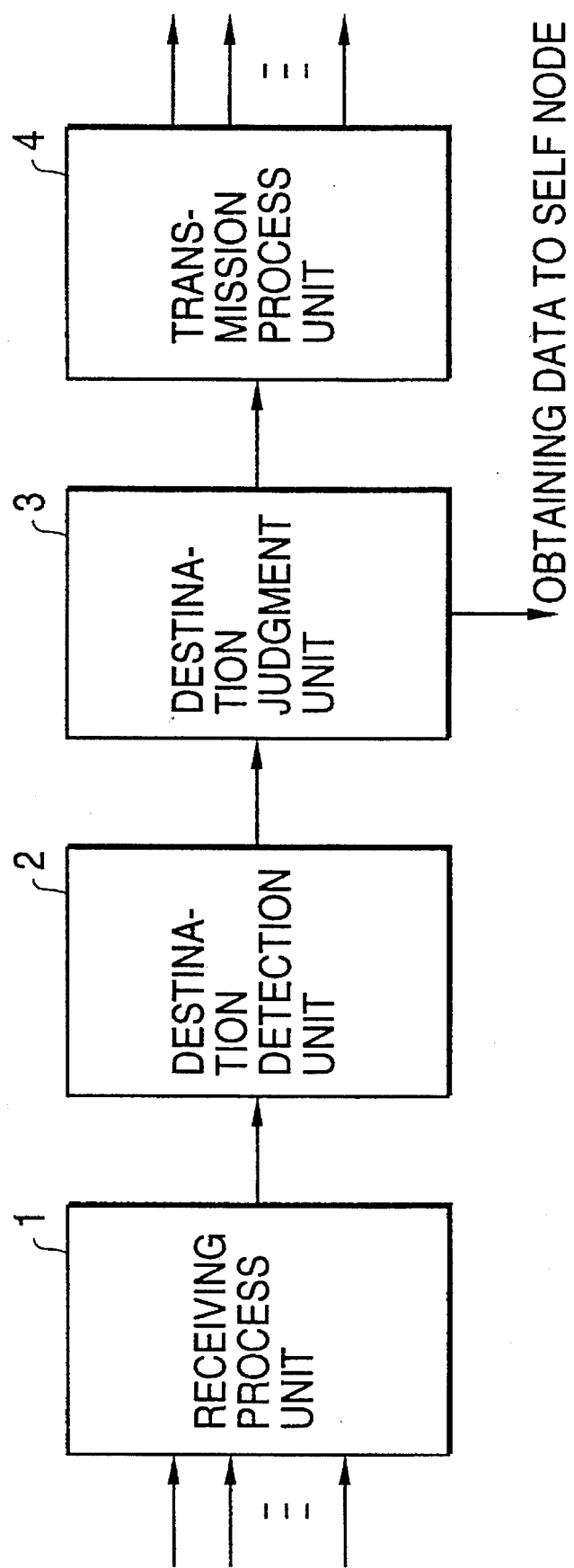
FIG. 1 shows a block diagram of the prior art communication system.
Figure 2:
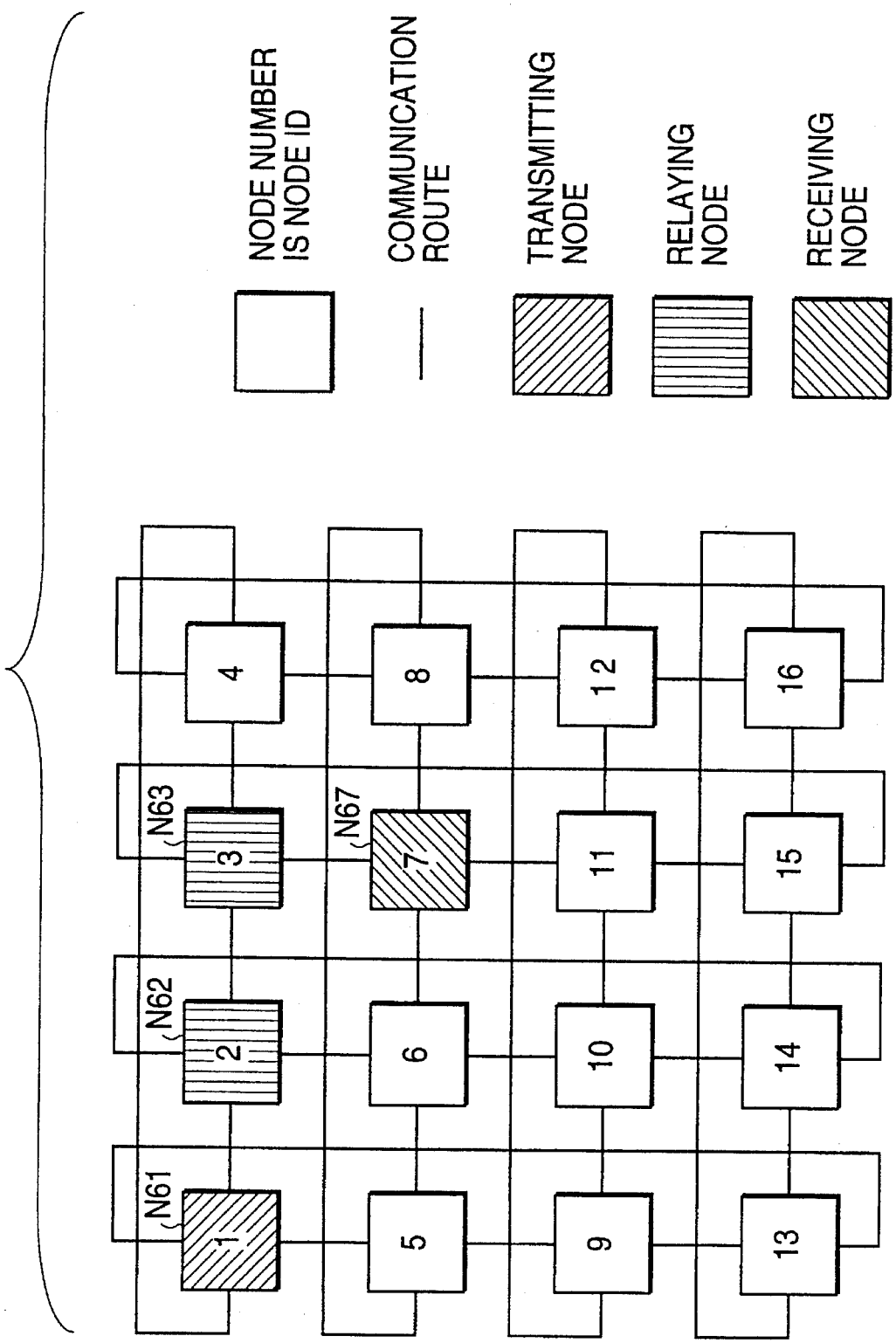
FIG. 2 shows an example of the prior art communication system used for two-dimensional torus-connection nodes.
Figure 3:
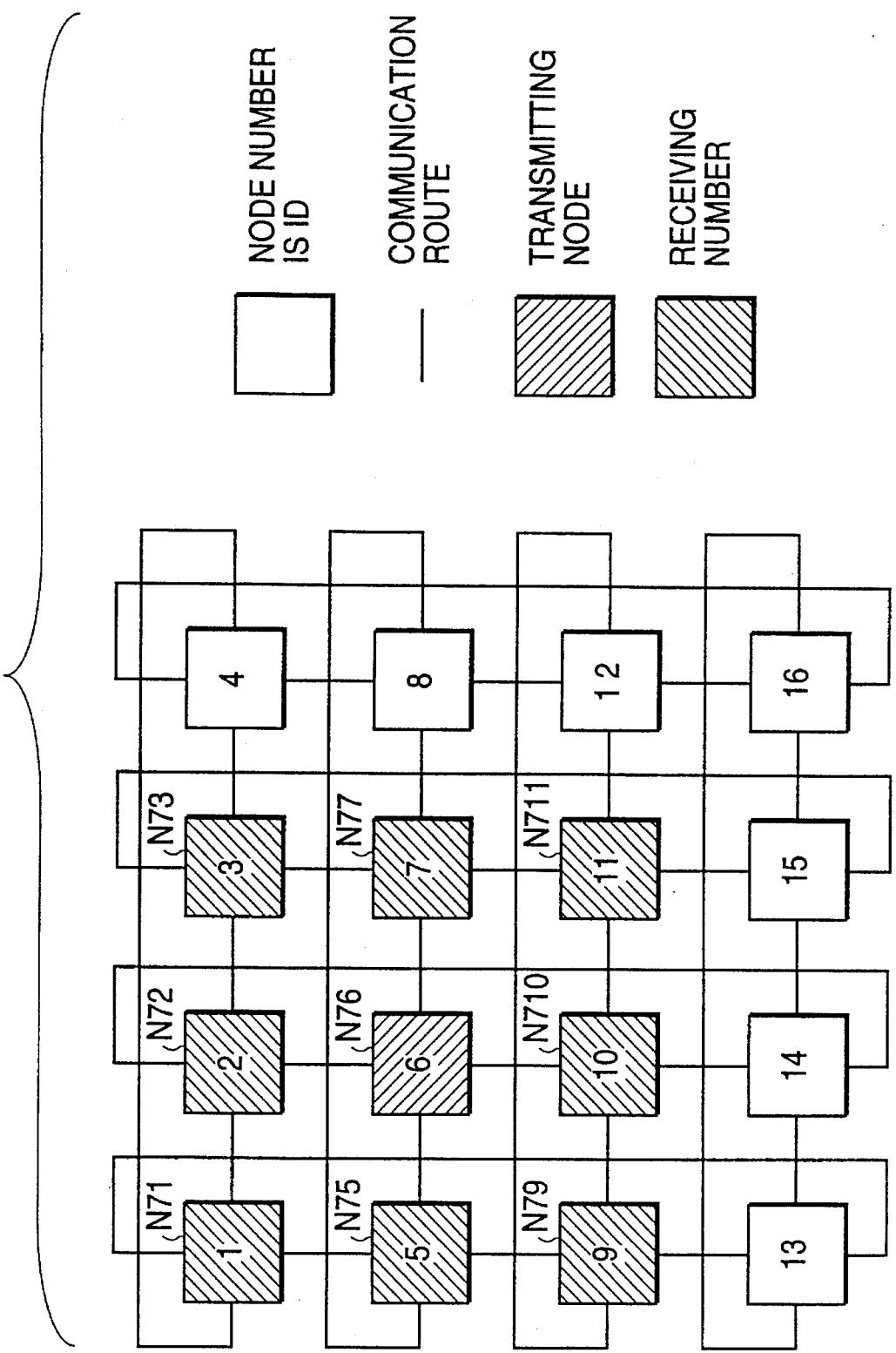
FIG. 3 shows another example of the prior art having torus connection nodes.
Figure 4:
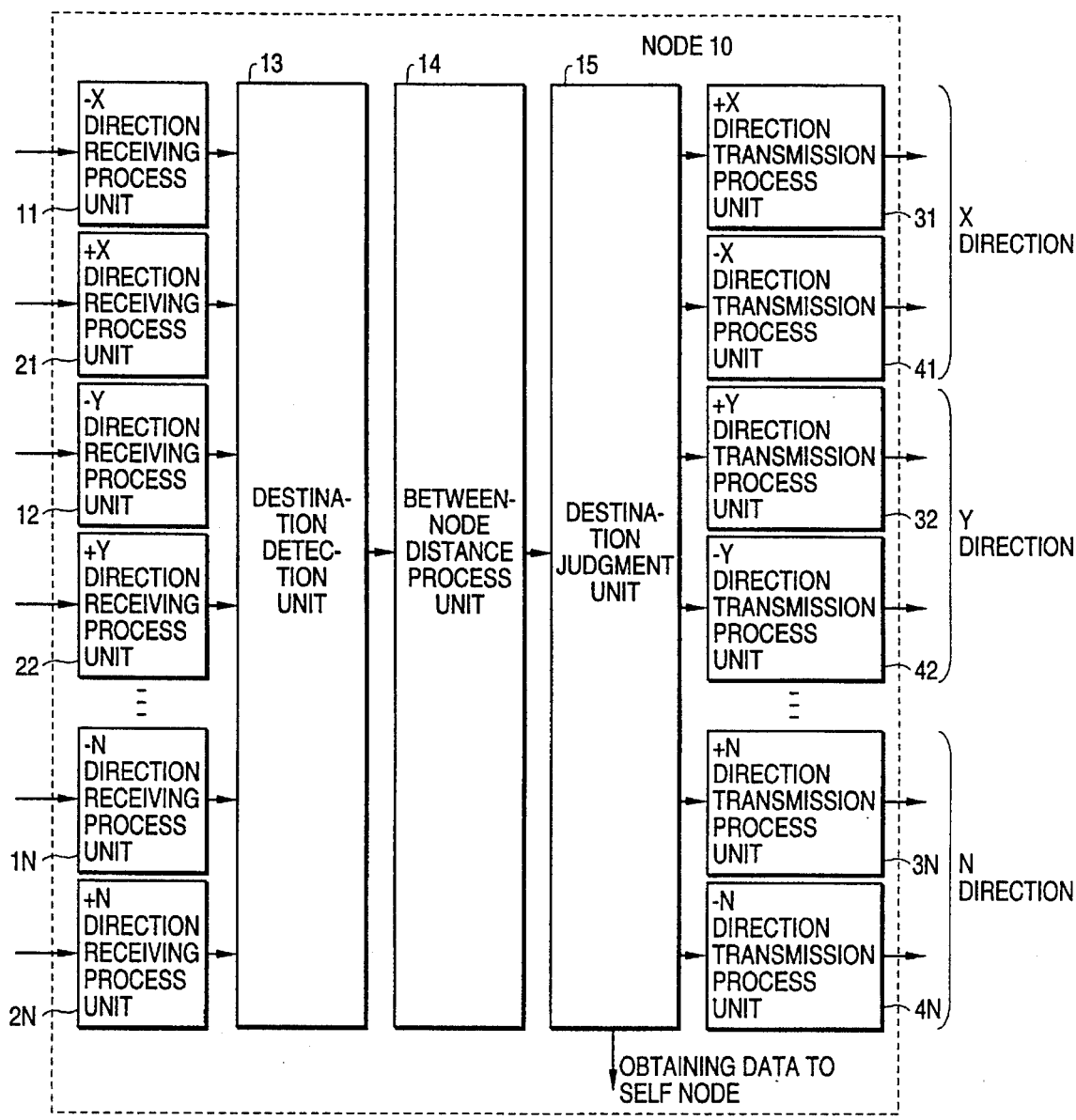
FIG. 4 shows a block diagram showing the principle of the present invention.

FIG. 4 shows a block diagram of a principle of the present invention by explaining a structure of node 10.

Receiving process units 11, 12, ... 1N, and 21, 22, ... 2N are for receiving the data transmitted from the other node in respective directions. A destination detecting unit 13 detects the destination 10 information designating the scope of the destination node from the data. A between-node distance process unit 14 obtains the node distance between the particular computer node and the destination computer node based on the destination information. A destination judgment unit 15 judges or determines whether or not the data should be obtained by the self node and whether or not the data should be transmitted further or relayed based on the node distance information. It then judges the transmission direction. Transmission process units 31, 32, ... 3N, and 41, 42, ... 4N are for transmitting the data subjected to destination judgment.

The operation of the apparatus shown in FIG. 4 is next explained.

As shown in FIG. 4, the receiving process units 11, 12 ... 1N, and 21, 22, ... 2N receive the data transmitted from the other nodes in respective directions. A destination detecting unit 13 detects the destination information designating the scope of the destination node from the data and the between-node distance processing unit obtains a node distance between the particular or self computer node and the destination computer node based on the destination information. Next, a destination judgment unit 15 judges whether the data should be obtained by the self node (node 10). Simultaneously, the destination judgment unit 15 determines whether or not the distance is 0 based on the obtained between-node distance and then determines the direction in which the data is further transmitted. It then provides the data to the transmission processing units in respective directions. Transmission processing units 31, 32 ... 3N, and 41, 42, 4N transmit the data provided from the destination judgment unit 15 to the destination node.

Figure 5A:
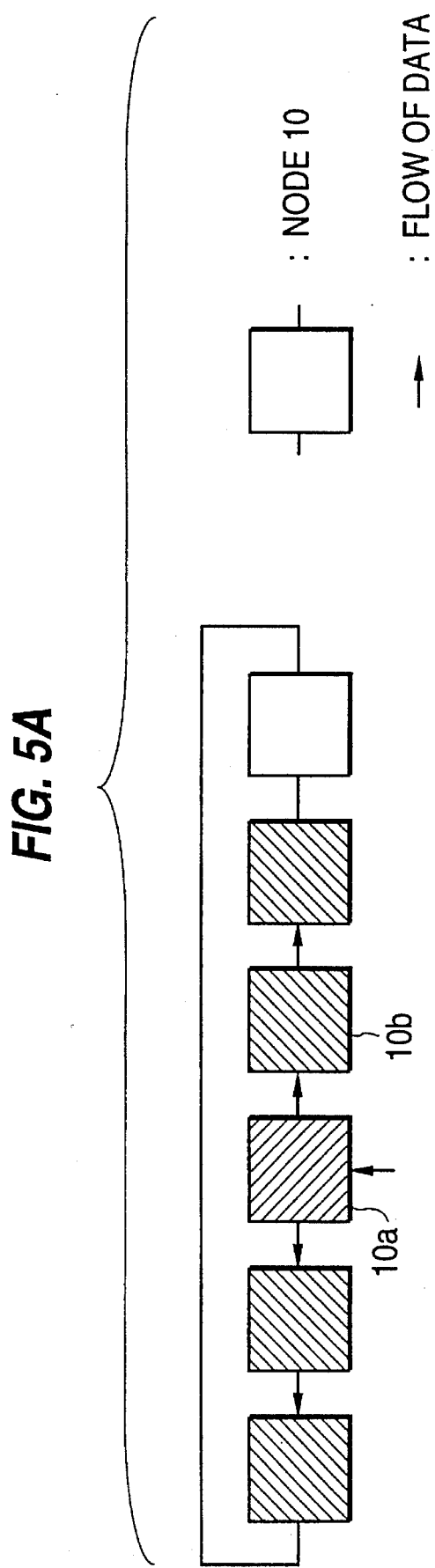
FIG. 5A shows a block diagram of a one-dimensional network.
Figure 5C:
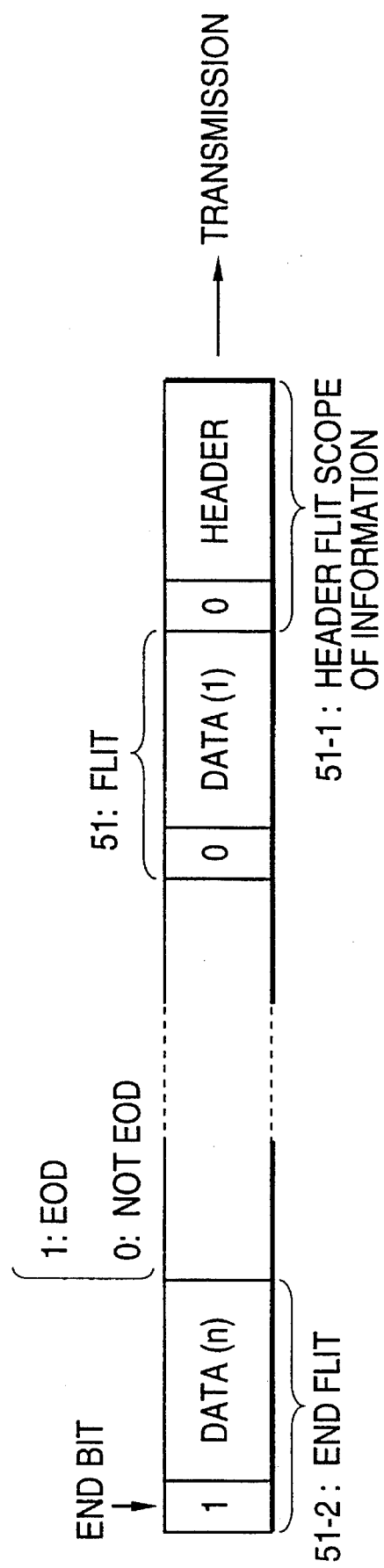
FIG. 5C shows an embodiment of a data-flit used in the present invention.

As shown in FIG. 5C, the message is divided into transmission units of flits 51. Header flit 51-1, having the scope information of the broadcast communication, is provided at the head of the message and the end flit 51-2 is provided at the end of the message. The message is sequentially transmitted from one node 10a to the other node 10b in the network. The receiving node 10 refers to header flit 51-1 and when the scope information designates that the message should be transmitted to the other or another node 10, the scope information is updated and header flit 51-1 is transmitted to the other node 10 in the transmission direction and the following or other flits 51 transmitted after the header flit 51-1 are sequentially transmitted until the end flit 51-2 is transmitted.

Therefore, the scope information of the broadcast communication is provided in header flit 51-1 at the head of the flit 51 obtained by dividing the message into transmission units and then flits 51 are sequentially transmitted. Node 10b, which receives the flit, refers to the scope information, preserves (stress) the message in the self node and transmits it to the other node 10 in the transmission direction. This operation is repeated, thereby achieving a high speed and efficient broadcast communication in the worm-hole routing.

According to the worm-hole routing provided in the communication system between parallel computers, the message is divided into the smallest possible transfer unit (comprising several bytes), called a flit, and the message includes the header flit with the destination information. The header flit is then transmitted from node to node through a relay route within a network until it reaches the destination node. The flits following the header flit are sequentially transmitted to the destination node by occupying the transmission route until the end flit reaches the destination node, thus enabling one block of the message to be transmitted.

FIG. 5A shows an example of a data flow of a broadcast communication in a one dimensional network. 10a is a transmission node and the hatched nodes 10b designate the receiving nodes. In this case, the scope information of the transmission is 2 and thus the message is broadcast to or until the node provided two nodes ahead in both directions from transmission node 10a.

FIG. 5B shows an example of data of a broadcast communication in a two dimensional network. 10a designates a transmission node and the hatched nodes 10b designate the receiving nodes. In this case, the scope information of the transmission is 2 in the X direction and 1 in the Y direction. The message is broadcast to the node two nodes ahead in the +X and -X directions and is broadcast to the node provided one node ahead in the +Y and -Y directions from transmission node 10a.

FIG. 5C shows an example of a flit. Flit 51 is obtained by dividing the message into transmission units (for example, units of several bytes). The message comprises a header flit 51-1 provided at the head of the message, flits with data and an end flit 51-2 provided at the end of the message. The scope information of the transmission in the broadcast communication is stored in the header flit 51-1. The scope information of the transmission designates the number of nodes through which the message is transmitted in a one-dimensional network and designates the number of nodes through which the message is transmitted in *X direction and *Y direction in the two-dimensional network. The end flit 51-2 designates EOD (end of file or the end of the flit) by making the end bit "1".

The present invention is explained in detail by referring to the flowchart shown in FIG. 6.

Figure 6A:
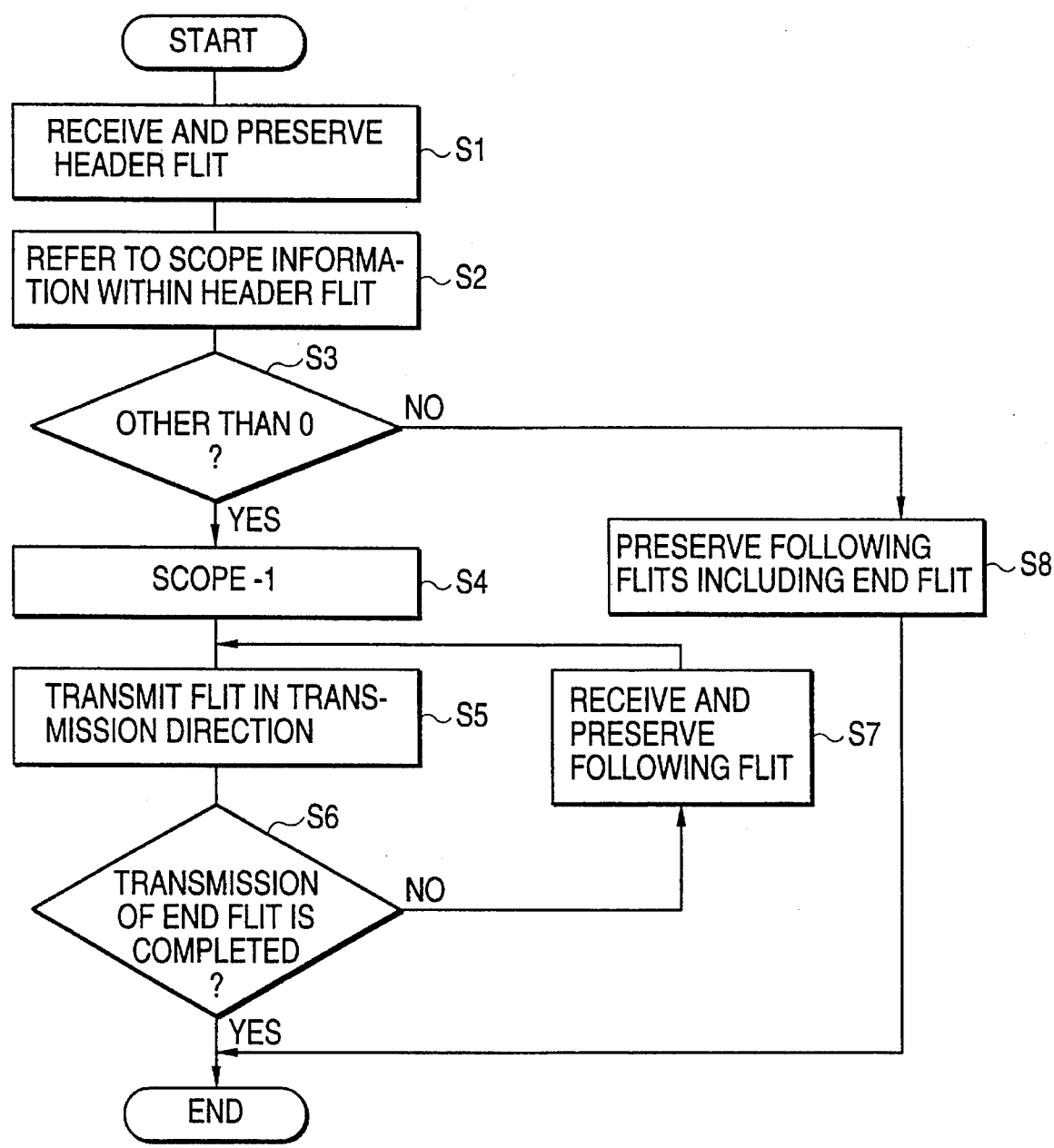
FIGS. 6A and 6B show a flowchart of another embodiment of the present invention

In FIG. 6A, at step S1, the header flit is received and preserved. For example, a hatched node 10b, as shown in FIGS. 5A and 5B, receives header flit 51-1 shown in FIG. 5C and preserves the content of the message in the self node 10.

At step S2, the scope information of the transmission within the header flit is referred to.

Step S3 determines whether the content of the header flit is other than 0. In case of YES, the flits (including the header flit and the other flits) are sequentially transmitted in the transmission direction through steps S4 to S7. In case of NO in step 3, the self node is the end node of the broadcast communication and the header flit is not transmitted to the other node. The following flits, including the end flit, are preserved (stored) at step S8.

In step S4, 1 is subtracted from the scope information of the transmission. The scope information of the transmission is thereby judged as being other than 0 in step S3 and transmission of the message to the other node is required.

In step S5, the flit (including the head flit and data flit) is transmitted in the transmission direction. Therefore, the flit is transmitted to the adjacent node in the transmission direction.

In step S6 it is judged (determined) whether the transmission of the end flit is completed. In the case of YES, all the flits from the header flit to the end flit are transmitted in the transmission direction, thereby completing the process. In case of NO, the next or following flit is received in step S7, and it is preserved and transmitted in the transmission direction, as shown in step S5. This routing process is repeated.

According to the above recited procedure, in a certain node, 1 is subtracted from the scope information of the transmission when the scope information of the transmission of the received head flit 51-1 is other than 0 and the head flit 51-1 to end flit 51-2 are sequentially transmitted to the node provided in the transmission direction. Therefore, the broadcast communication continues until the scope information becomes 0.

Figure 6B:
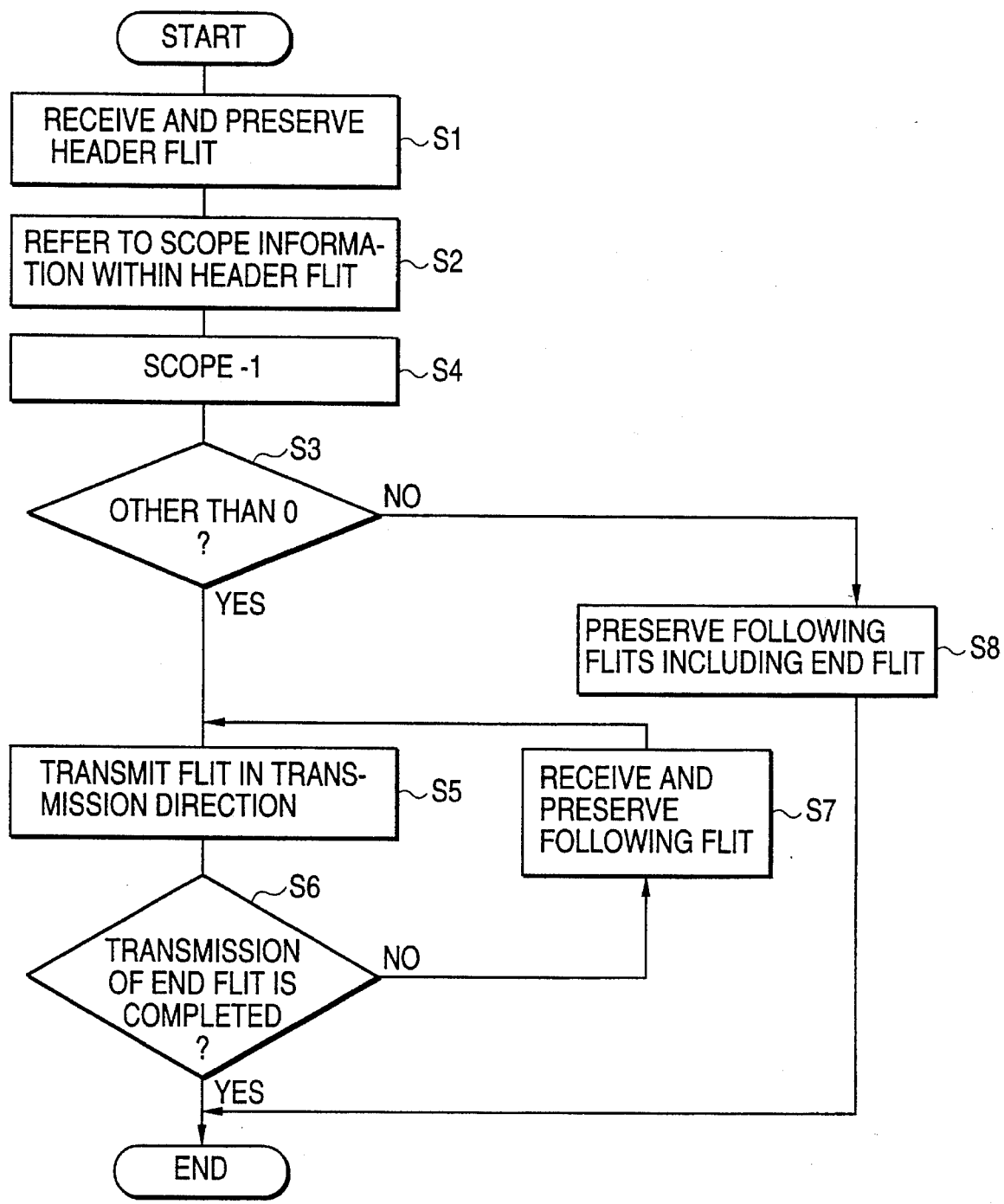

As shown in FIG. 6B, the process (step S3) of subtracting 1 from the scope information may be performed prior to the judgment (step S4) as to whether the scope information is 0.

Figure 7A:
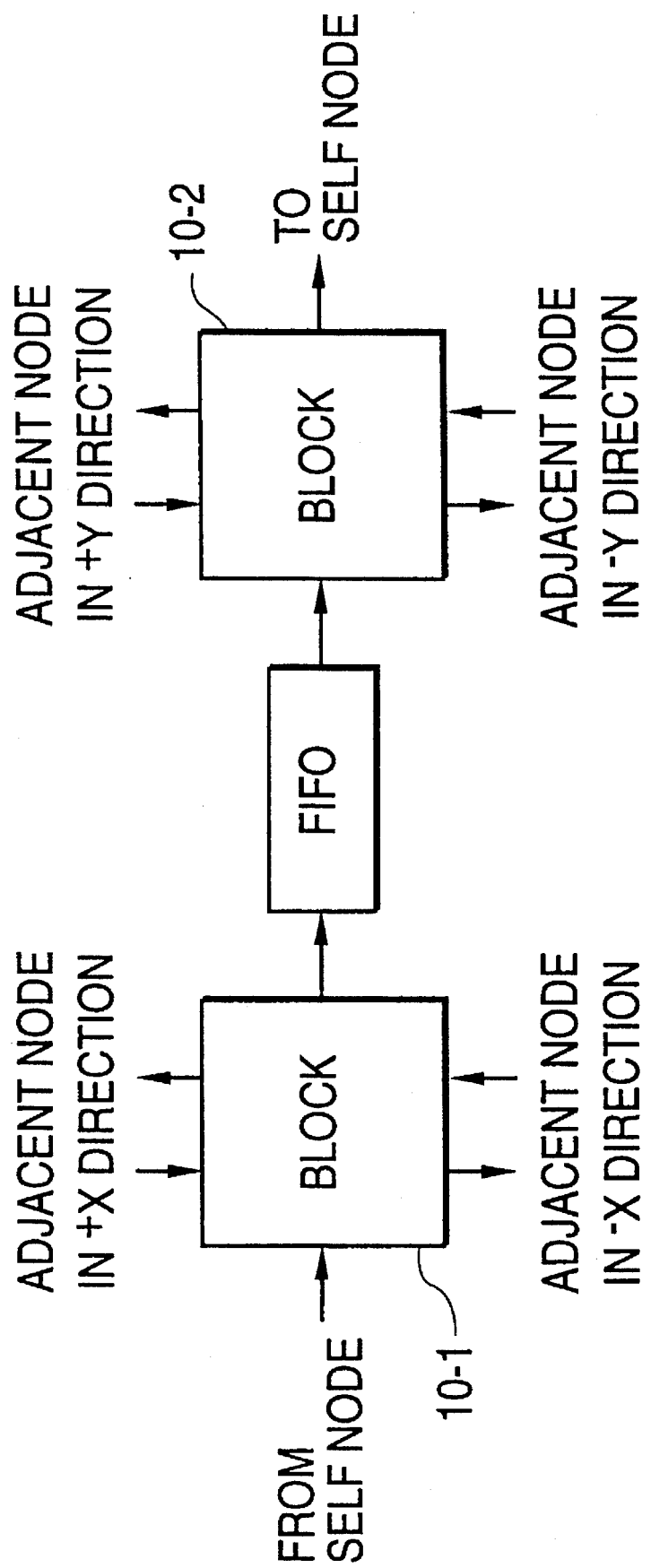
FIG. 7A shows a block diagram of a routing in both the X and Y directions.

FIG. 7A shows an example of one node used for the two-dimensional network shown in FIG. 5B. 10-1 is a block for performing a routing in the X direction. 10-2 is a block for performing a routing in the Y direction. FIFO is a buffer for temporarily storing the data (flit) flowing from the X direction to the Y direction. The scope information in the X direction within the header flit 51-1 received by block 10-1 has 1 subtracted from it and is transmitted to the adjacent node in the +X direction or to the adjacent node in the -X direction in accordance with the scope information in the X direction. The scope information in the Y direction within the header flit 51-1 received by block 10-2 is transmitted to the adjacent node in the +Y direction or the adjacent node in the -Y direction in accordance with the scope information in the Y direction.

Figure 7B:
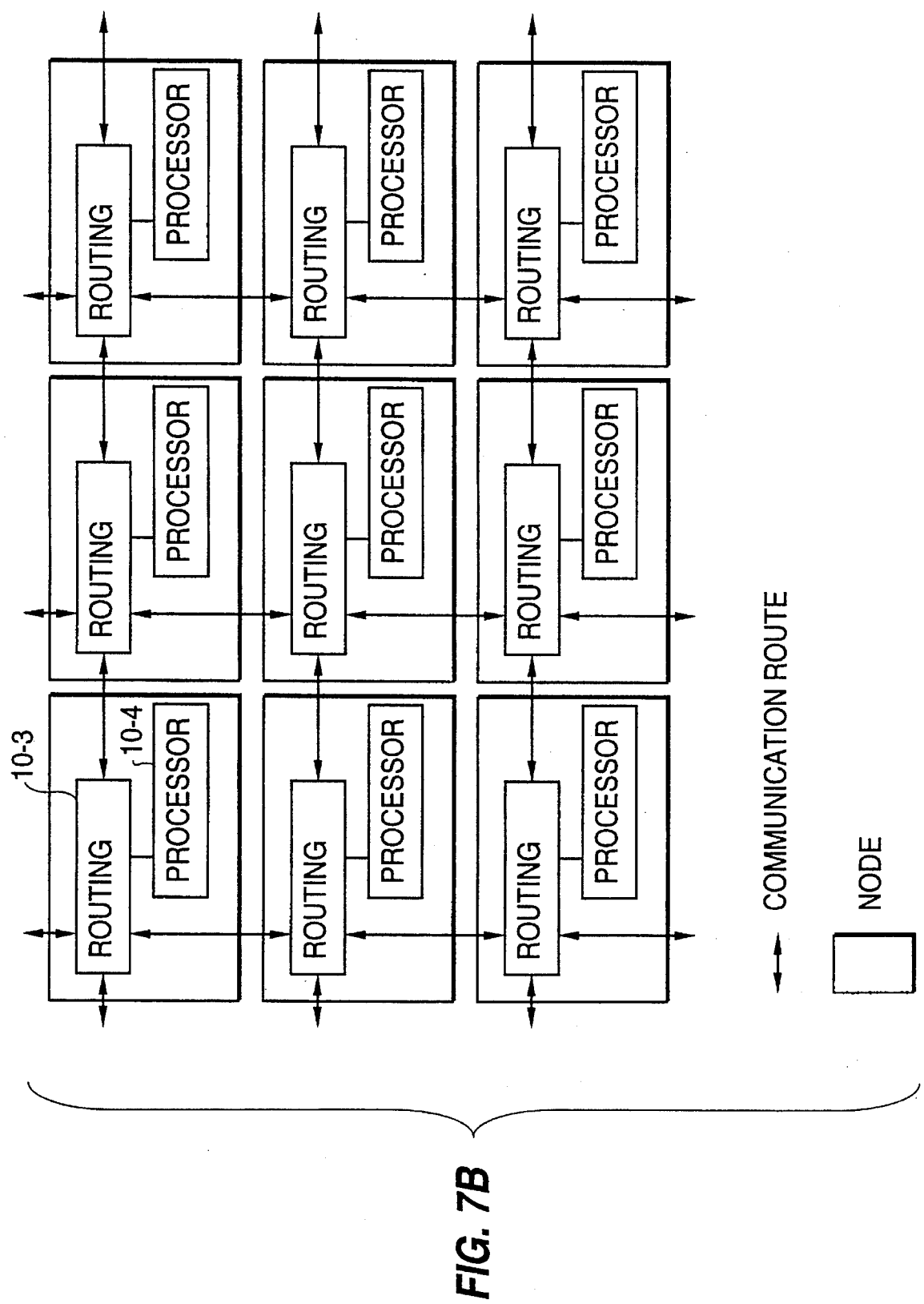
FIG. 7B shows a block diagram of the whole structure of a plurality of nodes connected in parallel.

FIG. 7B shows the whole structure of the present invention in which the example of the node shown in FIG. 7A forms the two-dimensional network as shown in FIG. 5B. The routing 10-3 forms a routing operation in the *X direction and the *Y direction and a processor 10-4 performs the above recited process to conduct a broadcast communication within a limited scope information. The routing 10-3 and the processor 10-4 operate in accordance with a flowchart shown in FIGS. 6A or 6B.

Figure 8:
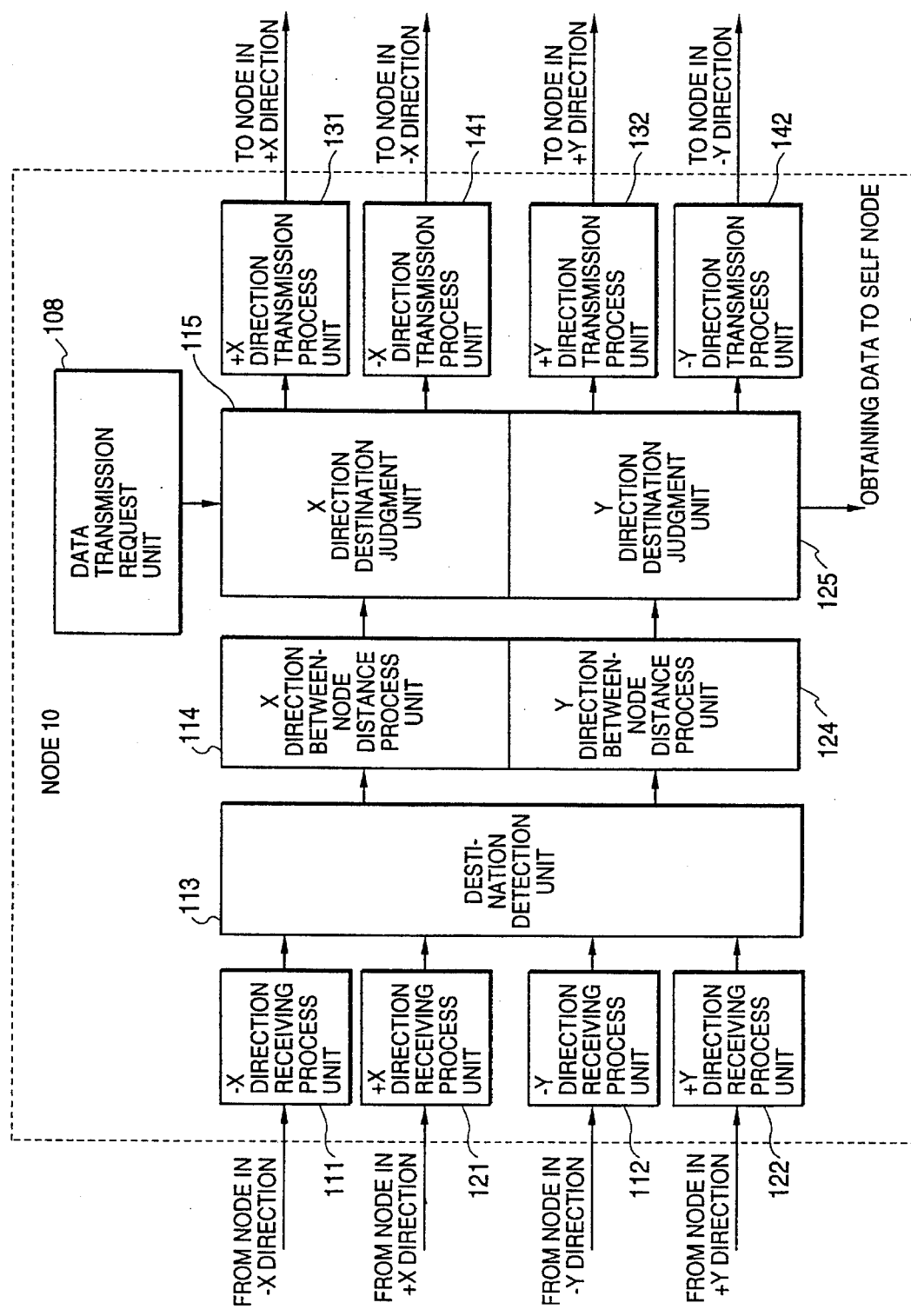
FIG. 8 shows a block diagram of an embodiment of the present invention.
Figure 9:
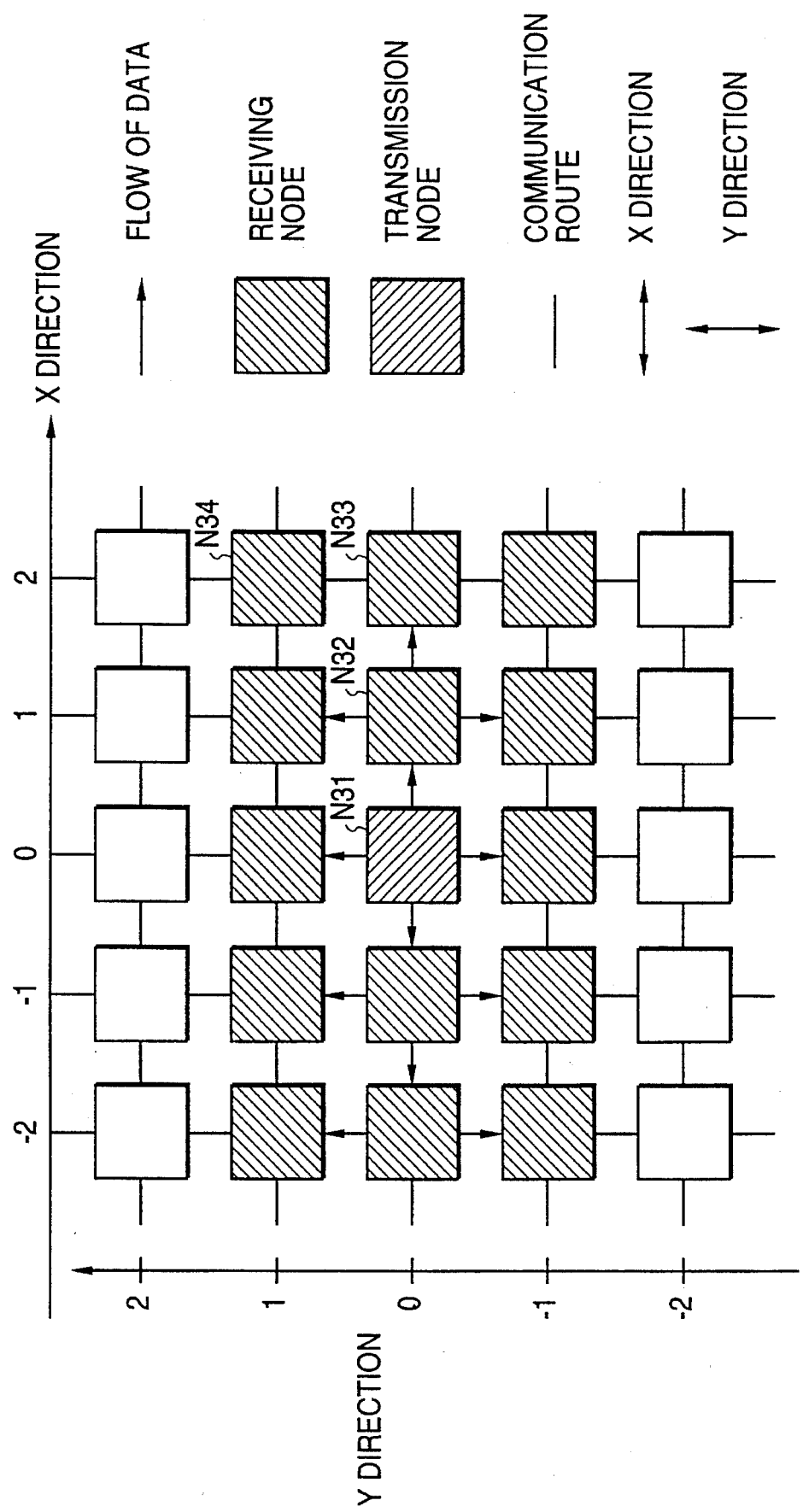
FIG. 9 shows an explanatory view of the embodiment of the present invention.

The operations in the X and Y directions are explained in more detail by referring to FIGS. 8 to 10.

FIG. 8 shows a process block diagram of a node 10 according to the present embodiment.

Receiving process units 111 and 121 receive the data transmitted in the X direction, and receiving process units 112 and 122 receive data transmitted in the Y direction. Destination detecting unit 113 detects the destination information designating the scope of the destination node from the data. The X-direction between-node distance processing unit 114 and the Y-direction between-node distance processing unit 124 obtain the node distance between the particular computer node and the destination computer node based on the destination information. The X-direction destination judgment unit 115 and the Y-direction destination judgment unit 125 judge whether or not the data should be obtained by the self node and judges based on the distance information whether or not further transmission of data is necessary and determines the transmission direction. The X direction transmission process unit 131 and 141 and Y direction transmission process unit 132 and 142 are for transmitting the data whose destination is determined. Data transmission request unit 108 determines the scope of the broadcast communication and requests the broadcast communication in accordance with an input designation from a keyboard, for example, as a means for requesting the transmission, where a particular node is the transmission source node.

Next, the operation of the present embodiment is explained where the transmission node N31 performs a broadcast communication toward respective receiving nodes in a two-dimensional lattice network as shown in FIG. 9.

Where the broadcast communication starts from transmission node N31, first, the scope of the communication is designated. Then, as shown in the transmission node process flow shown in FIG. 10A, data process request unit 108 produces the data designating that the broadcast scope of the X direction=2 and that the broadcast scope of the Y direction=1, at step S11. At step S12, the distance in the X direction is determined based on the request data. When the distance in the X direction is not 0, at the next step S13, the data is transmitted in both the +X and the -X directions. The data is also transmitted in the +Y and the -Y directions through the processes recited in steps S14 and S15.

FIGS. 10B to 10E show the process flow in respective nodes of the data transmission from transmission node N31 to receiving node N34. Transmission node N31 transmits the data with the scope of the node designated as 2 in the X direction and 1 in the Y direction. The receiving node N32 receives the data from node N31 in the -X direction at step S21. Next, destination detecting unit 103 detects destination information XID and YID. As XID=2 at first, between-node distance XID is obtained at step S22 by subtracting 1 from the destination information XID. Then the new XID=XID-I=I. Thus, step S23 judges whether XID=0 in order to determine that the data should be further transmitted in the X direction. The following step S24 then transmits data in the +X direction. On the other hand, as Y direction between-node distance YID=1, step S25 determines that the data should be transmitted in the Y direction, and at step S26, data is transmitted in the +Y and the -Y directions.

Figure 10A:
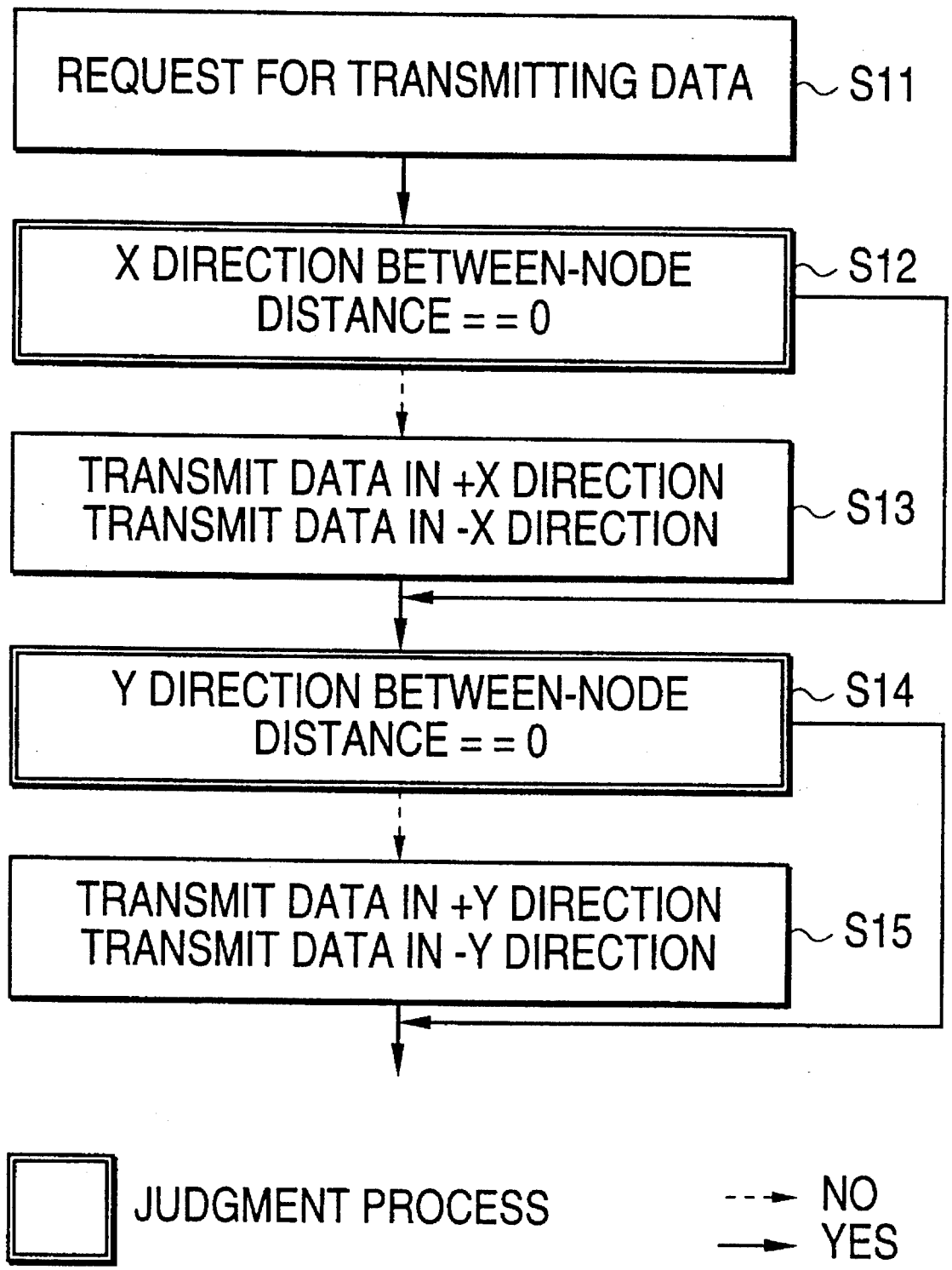
Figure 10B:
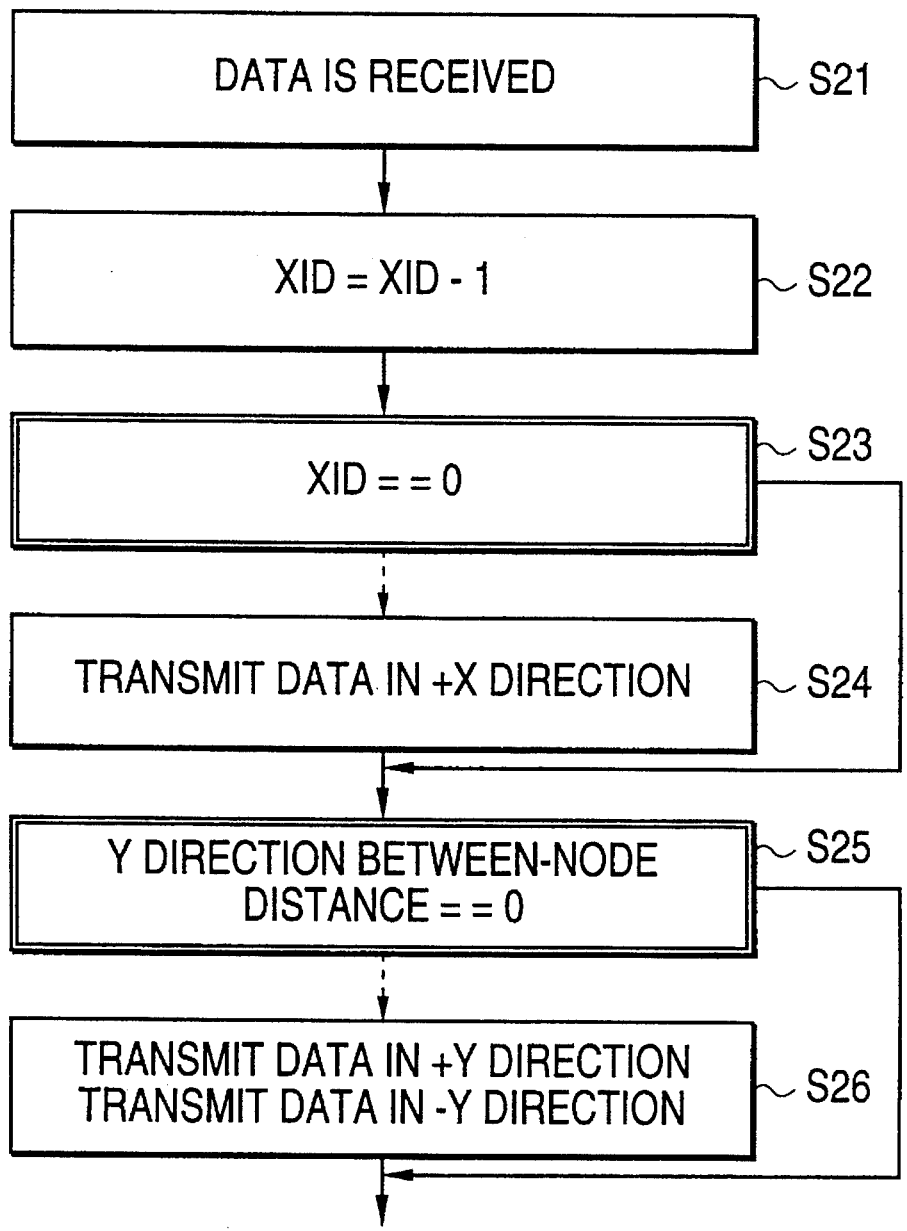

Next, the process flow of node N33 receiving the data from receiving node N32 also performs as shown in FIG. 10B. Namely, if the process flow is for receiving the data in the -X direction (step S2), XID=1 at first, and the new XID=XID-1=0 (step S23). Thus, the data transmission is not performed in the X direction (step S24). On the other hand, Y-direction between-node distance YID=1 and the data is transmitted in the +Y and -Y directions (steps S25 and S26).

The step S21 corresponds to -X direction receiving process unit 11 and destination detection unit 13 shown in FIG. 4, the step S22 between-node distance process unit 14, the step S23 destination judgement unit 15, and the step S24 +X direction transmission process unit 31.

Figure 10C:
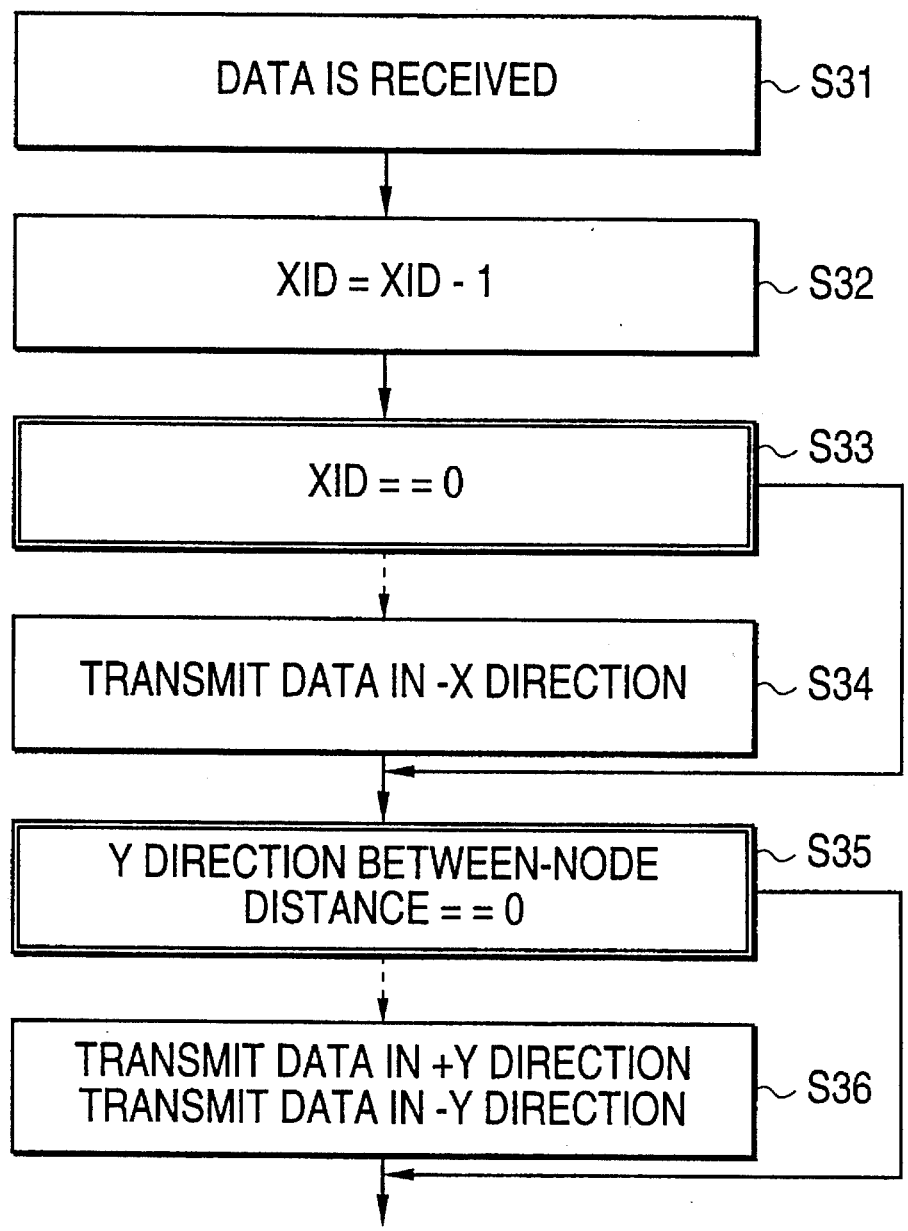
Figure 10D:
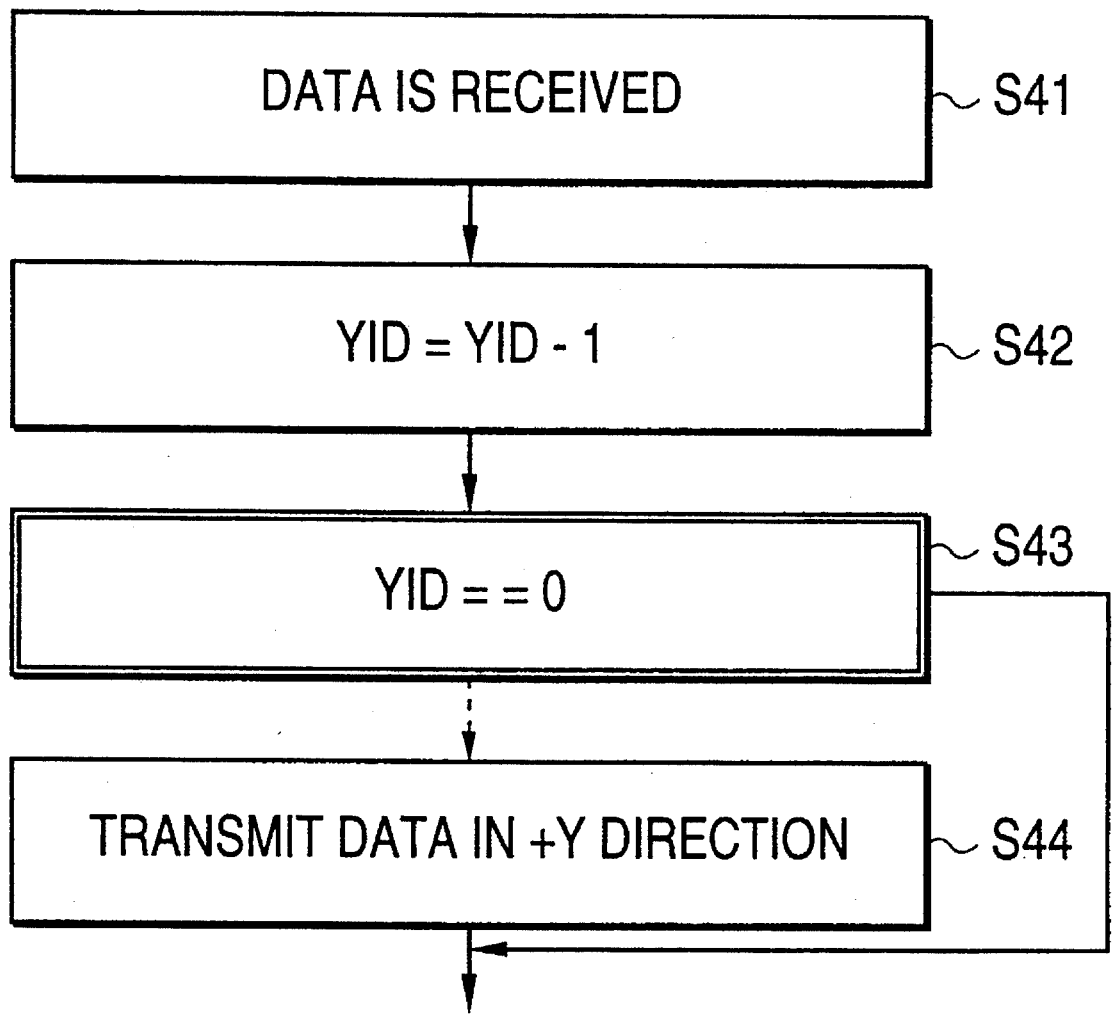

The process of the node N34 receiving the data from node N33 is shown in FIG. 10D. At first, at step S41, the data is received in the −Y direction and as YID=1 at first, the new YID=YID−1 of the between node distance is obtained at step S42, and step S43 determines that the data is not transmitted in the Y direction when YID=0 (step S43). Then, the step for transmitting data in the +Y direction (step S44) is not performed.

FIG. 10C and FIG. 10E show respectively the process for receiving the data from a right node in the +X direction in accordance with steps S31 to S36 and the process for receiving data from an upper node in the +Y direction in accordance with steps S51 to S54.

A similar process in accordance with the flowchart in FIGS. 10A to 10E is conducted in other receiving nodes and thus the data is transmitted to the nodes provided within the designated scope and the data is broadcast to all the nodes within the designated scope.

The system according to the present invention can be applied not only to a broadcast communication in which the scope of the symmetry area is designated with the transmission node as the center, but also to a broadcast communication in which the scope of the communication is shifted in a particular direction as shown in FIG. 11A by providing a different value of X between the plus direction and the minus direction.

Figure 11B:
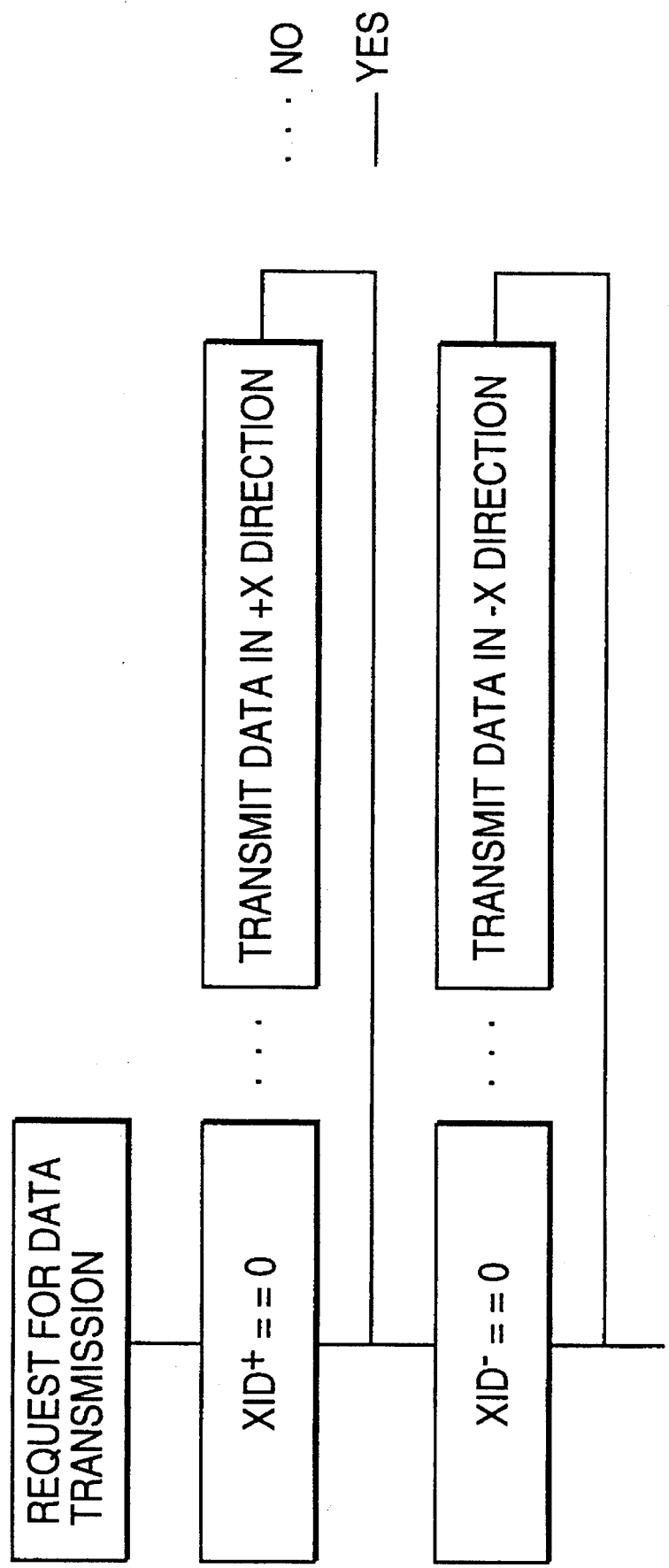
FIG. 11B shows a flowchart used in the transmitting node in the embodiment shown in FIG. 11A.

FIG. 11B shows a flowchart designating a control of a broadcast communication in which a broadcast scope is designated in a manner that it is shifted in a particular direction as shown in FIG. 11A. X direction between-node distance is defined as between-node distance in +X direction XID+ and between-node distance in −X direction XID−. XID+ is not equal to XID−. The header of the message include these two, namely, XID+ and XID−.

FIG. 11B shows a flowchart performed for a transmission node. When data transmission is requested, it is judged whether or not XID+=0. If XID+ is not equal to 0, the data is transmitted in the X direction. When XID+=0, data is not transmitted in the +X direction and it is judged whether XID−=0. If XID− is not equal 0, the data is transmitted in the −X direction.

When data XID+ is received in the −X direction, data is processed in accordance with a flowchart shown in FIG. 10B. When the data XID− is received the data is transmitted as shown in FIG. 10C. In an example shown in FIG. 11A, XID+=2 and XID−=1. At the transmission node, data are respectively transmitted in the +X direction and −X direction as XID+=2 and is not equal to 0 and XID−=1, and is not equal to 0. The receiving node in the +X direction, XID+=2 is subtracted by 1 at the node in accordance with the flowchart shown in FIG. 10B and the data is transmitted to the second node counting from the transmission node in the +X direction. The receiving node in the −X direction provides XID+−1=1 in accordance with the flowchart shown in FIG. 10C and thus the data is transmitted to the first node in the −X direction. Therefore, a shifted scope of the node with regard to the transmission node can be designated as the broadcast scope.

Figure 12A:
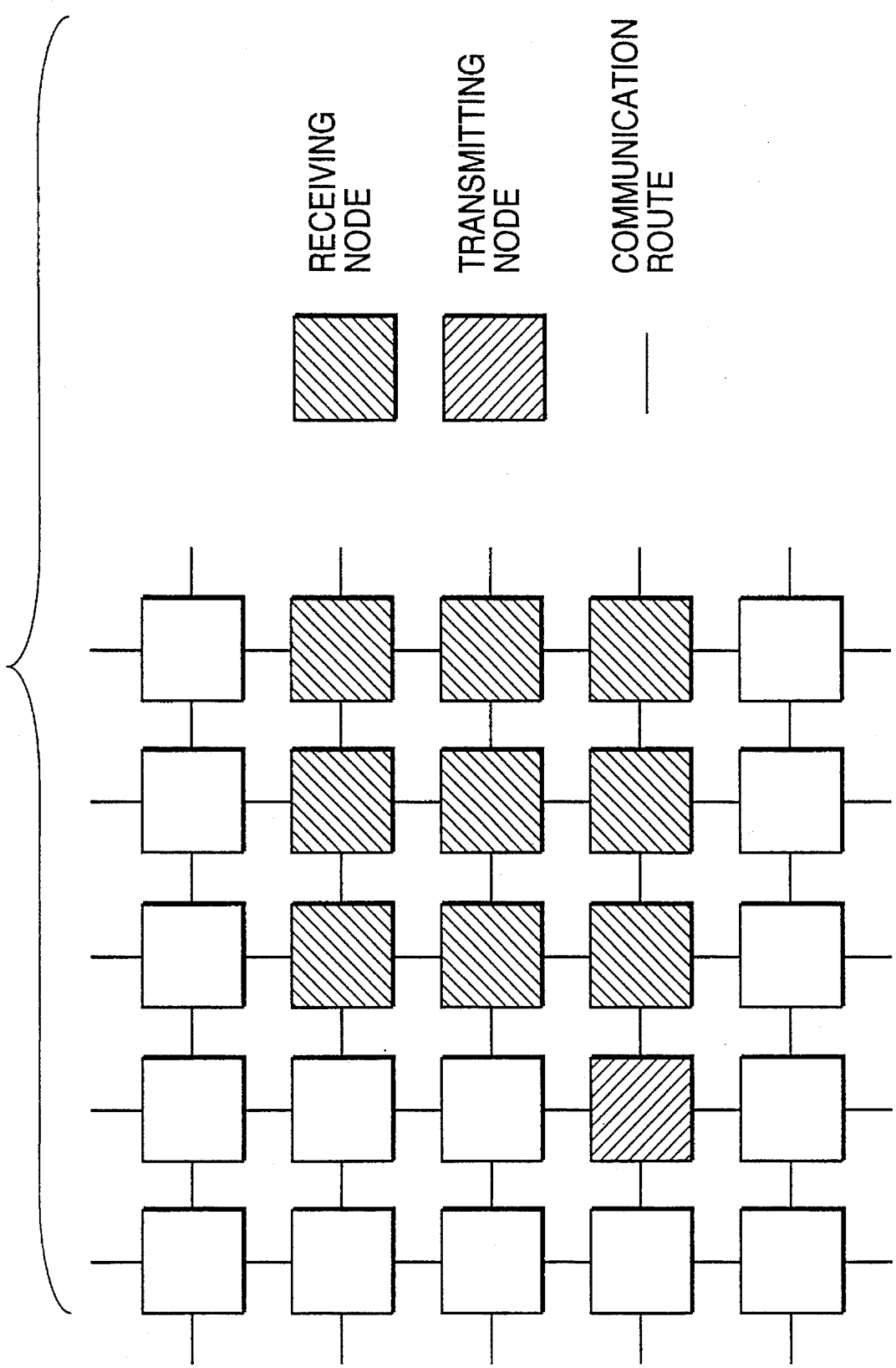
FIG. 12A shows an embodiment in which the scope of the destination does not include the transmission node.

The designation of the scope is also made possible in one direction by providing two values X1 and X2, in the same direction, for example, in X direction making it possible to designate the scope of the communication without including the transmission node, as shown in FIG. 12A.

Figure 12B:
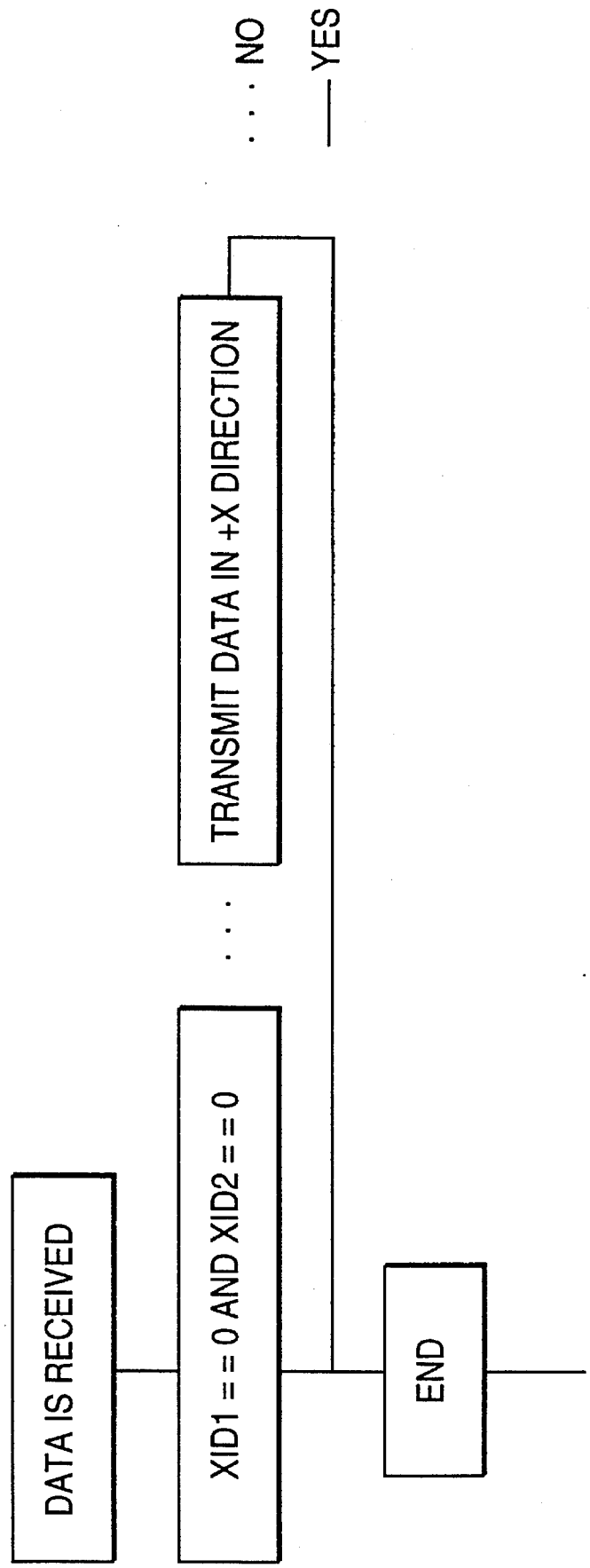
FIG. 12B shows a flowchart for use in a transmission node in the embodiment in FIG. 12A.
Figure 12C:
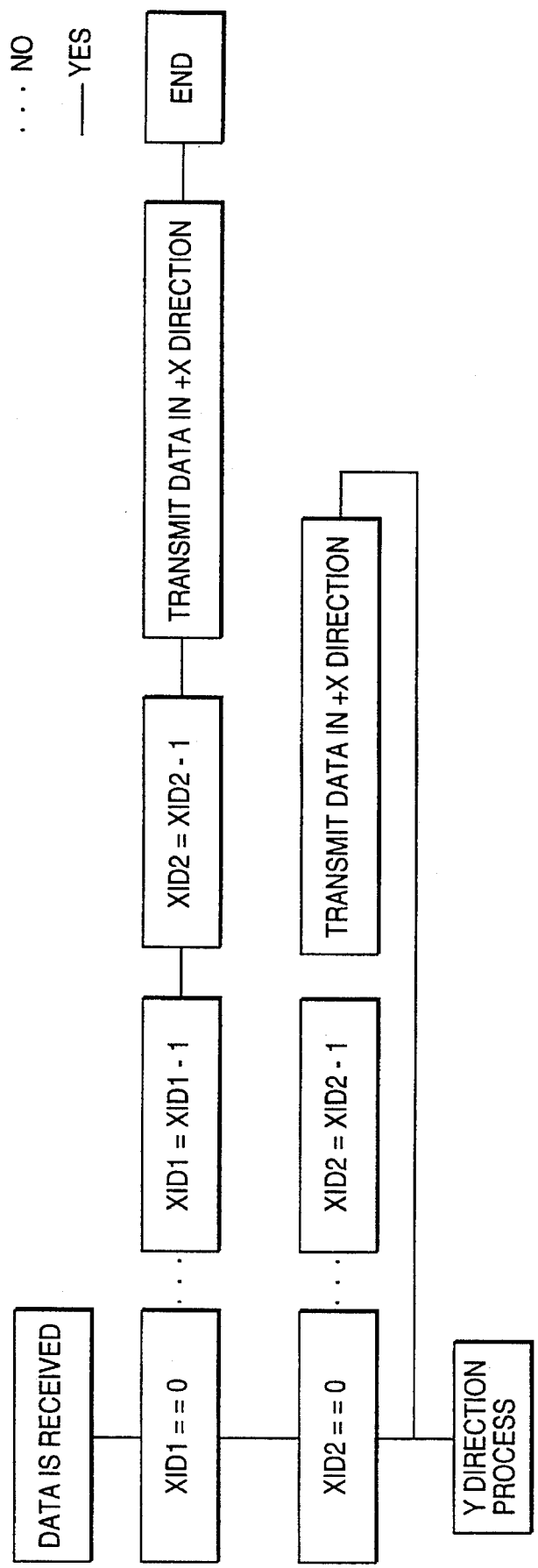
FIG. 12C shows a flowchart used when the data is received in -X direction.

FIGS. 12B and 12C show a flowchart designating a control of a broadcast communication to designate the scope of the broadcast which does not include the transmission node, as shown in FIG. 12A. The between-node distance in the X direction is XID1 and XID2. XID1<XID2 and both XID1 and XID2 are not negative.

FIG. 12B shows a flowchart for the transmission node. When the data transmission is requested, when XID1 is not equal to 0 and XID2 is not equal to 0, data is transmitted in the +X direction. When XID1=0 and XID2=0, data is not transmitted from the transmitting node.

Next, as shown in FIG. 12C, according to the flowchart for a receiving node for receiving the data in the −X direction it is judged whether XID1=0. When XID1 is not equal to 0, the operations of XID1=XID1−1 and XID2=XID2−1 are performed and the data is transmitted in the +X direction. When XID=0, it is judged whether XID2=0. When XID2 is not equal 0, an operation of XID2=XID2−1 is performed and the data is further transmitted in the +X direction. Then the process advances to the process in the Y direction.

In the next node, when XID1=0, it is judged whether XID2=0. If XID2=0, the data is no longer transmitted in the +X direction and the process starts for the Y direction.

In the example shown in FIG. 12A, XID1=2 and XID2=4, as a transmission node, and since XID1=2 and is not equal to 0 and XID2=4 and is not equal to 0, data is transmitted in the +X direction, as shown in FIG. 12B. The first node on the right side from the transmission node, XID1=2−1=1 and XID2=4−1=3 and thus data is transmitted in the +X direction. In the second node on the right side from the transmission node, XID1=2−1−1=0 and XID2=4−1−1=2 and thus data is further transmitted in the +X direction. In the third node on the right from the transmission node, XID1=0 and XID2=XID2−1=4−2−1=1 the data is further transmitted in the +X direction. At the fourth node on the right from the transmission node, XID2=4−2−1−1=0 and thus data is not transmitted in the +X direction and the process for the Y direction will start.

In a one-dimensional connection, only the X direction can be considered. In a three-dimensional connection, the process in the Z direction may be added to those in the X and Y directions. In an N-dimensional connection, processes may be added in accordance with the number of dimensions.

On the other hand, for the apparatus of the transmission source node for performing a transmission request, the scope of the broadcast communication is designated and transmitted to the data transmission request part 108, thereby forming the data designating the scope of the broadcast communication and transmitting the data to the destination judgment unit 115, in accordance with the block diagram shown in FIG. 8.

As described above, according to the present invention, in a communication between parallel computers connected in a torus connection or a matrix connection, the message is divided into a flit 51 of the transfer unit, sequentially transferred by providing the header flit 51-1 with the scope information of the transmission and referred to the scope information in the receiving node 10b to preserve the received data in the self node. The received data is then simultaneously transmitted to the adjacent node in the transmission direction. This operation is repeated, so that the broadcast communication to the node with the designated scope can be performed with a smaller number of data transmissions and the designation of the scope of the communication can be easily made. This facilitates the communication node at each node and increases the efficiency of the communication control.

What is claimed is:

1. A communication control system provided in parallel nodes including adjacent nodes for performing a broadcast communication in an n-dimensional network between the parallel nodes, said communication control system comprising:

data receiving means for receiving data including scope information having node dimension directions transmitted from the adjacent nodes in respective directions;

destination detecting means for detecting destination information responsive to said scope information and said node dimension directions indicating destination nodes for receiving the data having a distance from a particular computer node not greater than said scope information;

between-node distance processing means for obtaining distance information between the particular computer node and the destination nodes, based on the destination information;

destination judgment means for determining whether the data should be maintained by a local node and transmitted to the adjacent nodes or the data should be maintained by a local node, and for determining a direction of transmission, based on the distance information; and transmitting process means for transmitting the data to the adjacent nodes with regard to a particular direction when said destination judgment means determines that the data is to be further transmitted.

2. The communication control system according to claim 1, wherein the scope information designates the destination nodes which are shifted in one direction from a symmetric scope of the destination nodes having a center; and the parallel nodes include an originating node as the center.

3. The communication control system according to claim 1, wherein said parallel nodes comprise computers connected in one of an N-dimension torus connection and an N-dimension matrix connection.

4. A communication control system provided in parallel nodes for performing a broadcast communication in a network between the parallel nodes, said communication control system comprising:

data receiving means for receiving data transmitted from adjacent nodes in respective directions;

destination detecting means for detecting destination information designating a scope of destination nodes indicating the adjacent nodes receiving the data;

between-node distance processing means for obtaining distance information between a particular computer node and the destination nodes, based on the destination information;

destination judgment means for determining whether the data should be maintained by a local node and transmitted to the adjacent nodes or the data should be maintained by a local node, and for determining a direction of transmission, based on the distance information; and transmitting process means for transmitting the data to the adjacent nodes with regard to a particular direction when said destination judgment means determines that the data is to be further transmitted, wherein said scope of the destination nodes is determined as a symmetric scope having a center and a symmetric area, and wherein the parallel nodes include an originating node as the center of the said symmetric area.

5. A communication control system provided in parallel nodes for performing a broadcast communication in a network between the parallel nodes, said communication control system comprising:

data receiving means for receiving data transmitted from adjacent nodes in respective directions;

destination detecting means for detecting destination information designating a scope of destination nodes indicating the adjacent nodes receiving the data;

between-node distance processing means for obtaining distance information between a particular computer node and the destination nodes, based on the destination information;

destination judgment means for determining whether the data should be maintained by a local node and transmitted to the adjacent nodes or the data should be maintained by a local node, and for determining a direction of transmission, based on the distance information; and transmitting process means for transmitting the data to the adjacent nodes with regard to a particular direction when said destination judgment means determines that the data is to be further transmitted, wherein said scope of the destination nodes is determined without providing an originating node within the scope of the destination nodes.

6. A broadcast communication system provided in parallel nodes, comprising:

flit means for providing flits obtained by dividing a message into transmission units, each of the flits including a header flit having information including node dimension directions indicating a scope of a broadcast communication and including flit data and an end flit and for broadcasting the message from a particular node to adjacent nodes among the parallel nodes in a network when a distance between the particular and adjacent nodes is not greater than said scope;

receiving means for receiving the header flit which is transmitted, and for maintaining the message at a local node when the information in said header flit designates that the message should be maintained at the local node;

updating means for updating the scope; and transmitting means for transmitting the header flit to another node provided in a transmission direction responsive to the node dimension directions, when the information in said header flit designates that the message should be transmitted to the adjacent nodes, and sequentially transmitting the flit data and the end flit following the header flit.

7. The broadcast communication system according to claim 6, wherein said parallel nodes comprise computers connected in one of an N-dimension torus connection and an N-dimension matrix connection.

8. A broadcast communication system provided in parallel nodes, comprising:

flit means for providing flits obtained by dividing a message into transmission units, each of the flits including a header flit having information indicating a scope of a broadcast communication and including flit data and an end flit and for broadcasting the message from a particular node to adjacent nodes among the parallel nodes in a network;

receiving means for receiving the header flit which is transmitted, and for maintaining the message at a local node when the information in said header flit designates that the message should be maintained at the local node;

updating means for updating the scope; and transmitting means for transmitting the header flit to another node provided in a transmission direction, when the information in said header flit designates that the message should be transmitted to the adjacent nodes, and sequentially transmitting the flit data and the end flit following the header flit, wherein said scope of a destination node is determined as a symmetric scope having a center, and a symmetric area, and wherein the parallel nodes include an originating node as the center of said symmetric area.

9. A broadcast communication system provided in parallel nodes, comprising:

flit means for providing flits obtained by dividing a message into transmission units, each of the flits including a header flit having information indicating a scope of a broadcast communication and including flit data and an end flit and for broadcasting the message from a particular node to adjacent nodes among the parallel nodes in a network;

receiving means for receiving the header flit which is transmitted, and for maintaining the message at a local node when the information in said header flit designates that the message should be maintained at the local node;

updating means for updating the scope; and transmitting means for transmitting the header flit to another node provided in a transmission direction, when the information in said header flit designates that the message should be transmitted to the adjacent nodes, and sequentially transmitting the flit data and the end flit following the header flit, wherein scope of destination nodes is shifted in one direction from a symmetric scope of the destination nodes having a center, and wherein the parallel nodes include an originating node as the center.

10. A broadcast communication system provided in parallel nodes, comprising:

flit means for providing flits obtained by dividing a message into transmission units, each of the flits including a header flit having information indicating a scope of a broadcast communication and including flit data and an end flit and for broadcasting the message from a particular node to adjacent nodes among the parallel nodes in a network;

receiving means for receiving the header flit which is transmitted, and for maintaining the message at a local node when the information in said header flit designates that the message should be maintained at the local node;

updating means for updating the scope; and transmitting means for transmitting the header flit to another node provided in a transmission direction, when the information in said header flit designates that the message should be transmitted to the adjacent nodes, and sequentially transmitting the flit data and the end flit following the header flit, wherein scope of destination nodes is determined without providing an originating node within the scope of the destination nodes.

11. A broadcast communication system provided in parallel nodes, comprising:

flit means for providing flits obtained by dividing a message into transmission units, each of the flits including a header flit having information including node dimension directions indicating a scope of a broadcast communication and including flit data and an end flit and for broadcasting the message from a particular node to adjacent nodes among the parallel nodes in a network when a distance between the particular and adjacent nodes is not greater than said scope;

receiving means for receiving the header flit, the flit data and the end flit which is transmitted, and for maintaining the header flit, the flit data and the end flit at a local node when the information in said header flit designates that the message should be maintained at the local node;

updating means for updating the scope; and transmitting means for transmitting the header flit to another node provided in a transmission direction responsive to the node dimension directions, when the information in said header flit designates that the message should be transmitted to the adjacent nodes, and sequentially transmitting the flit data and the end flit following the header flit.

* * * * *

UNITED STATES PATENT AND TRADEMARK OFFICE
CERTIFICATE OF CORRECTION

PATENT NO. : 5,553,078
DATED : September 3, 1996
INVENTOR(S) : Takeshi Horie

It is certified that error appears in the above-indentified patent and that said Letters Patent is hereby corrected as shown below:

```
Col. 1,   line 13,   after "and" insert --,--
          line 14,   after "particularly" insert --,--
          line 29,   change "determines" to --(determines)--

Col. 2,   line 17,   after "flits" insert --,-- line 35,   change "determining" to --(determining)--

Col. 6,   line 46,   change "I=I" to --1=1--
Col. 7,   line 36,   change "X" to --+X--

Col. 8,
          line 61,   delete "node"  (first occurrence)
```

Signed and Sealed this

Eleventh Day of February, 1997

Attest:

BRUCE LEHMAN

*Attesting Officer*   *Commissioner of Patents and Trademarks*